(12) United States Patent
Shokonji

(10) Patent No.: US 11,978,261 B2
(45) Date of Patent: May 7, 2024

(54) INFORMATION PROCESSING APPARATUS AND INFORMATION PROCESSING METHOD

(71) Applicant: SONY SEMICONDUCTOR SOLUTIONS CORPORATION, Kanagawa (JP)

(72) Inventor: Takafumi Shokonji, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 285 days.

(21) Appl. No.: 17/297,951

(22) PCT Filed: Nov. 22, 2019

(86) PCT No.: PCT/JP2019/045801
§ 371 (c)(1),
(2) Date: May 27, 2021

(87) PCT Pub. No.: WO2020/116206
PCT Pub. Date: Jun. 11, 2020

(65) Prior Publication Data
US 2022/0092876 A1    Mar. 24, 2022

(30) Foreign Application Priority Data
Dec. 7, 2018  (JP) .............................. 2018-230177

(51) Int. Cl.
*G06V 20/58*       (2022.01)
*G05D 1/00*        (2006.01)
(Continued)

(52) U.S. Cl.
CPC ........... *G06V 20/58* (2022.01); *G05D 1/0246* (2013.01); *G06V 10/25* (2022.01); *G06V 20/647* (2022.01)

(58) Field of Classification Search
None
See application file for complete search history.

(56) References Cited

U.S. PATENT DOCUMENTS

| 5,583,975 A * | 12/1996 | Naka ....................... G06T 15/06 345/643 |
| 2008/0059578 A1* | 3/2008 | Albertson ............... G06F 3/016 352/85 |

(Continued)

FOREIGN PATENT DOCUMENTS

| CN | 106060517 A | 10/2016 |
| CN | 108139475 A | 6/2018 |

(Continued)

OTHER PUBLICATIONS

International Search Report and Written Opinion of PCT Application No. PCT/JP2019/045801, dated Feb. 18, 2020, 09 pages of ISRWO.

*Primary Examiner* — Santiago Garcia
(74) *Attorney, Agent, or Firm* — CHIP LAW GROUP

(57) ABSTRACT

An information processing apparatus and an information processing method to properly acquire a location of a surrounding vehicle using three-dimensional detection information regarding an object around an own vehicle. A camera captures an image of surroundings of an own automobile, and a region of a vehicle in the captured image is detected as a frame, the vehicle being in the surroundings of the own automobile. Three-dimensional information regarding an object in the surroundings of the own automobile is detected, and a three-dimensional box that indicates a location of the vehicle in the surroundings of the own automobile is generated on the basis of the three-dimensional information. Correction is performed on the three-dimensional box (Continued)

on the basis of the frame, and the three-dimensional box is arranged to generate surrounding information.

15 Claims, 19 Drawing Sheets

(51) Int. Cl.
  *G05D 1/02* (2020.01)
  *G06V 10/25* (2022.01)
  *G06V 20/64* (2022.01)

(56) References Cited

U.S. PATENT DOCUMENTS

| | | | |
|---|---|---|---|
| 2008/0169914 A1* | 7/2008 | Albertson | G08B 21/06 340/425.5 |
| 2008/0170123 A1* | 7/2008 | Albertson | G06T 7/20 348/157 |
| 2008/0170749 A1* | 7/2008 | Albertson | G06V 10/95 382/103 |
| 2011/0098108 A1* | 4/2011 | Kuper | A63F 13/533 463/43 |
| 2012/0314030 A1* | 12/2012 | Datta | G06T 7/20 348/44 |
| 2013/0127850 A1* | 5/2013 | Bindon | G06T 19/20 345/420 |
| 2016/0307026 A1 | 10/2016 | Nishijima | |
| 2018/0267142 A1 | 9/2018 | Motoyama et al. | |
| 2018/0276841 A1* | 9/2018 | Krishnaswamy | G06V 10/25 |
| 2019/0206059 A1* | 7/2019 | Landman | G06T 7/66 |
| 2019/0333389 A1* | 10/2019 | Wang | G06T 7/62 |
| 2020/0145590 A1* | 5/2020 | Elboher | G06T 7/70 |
| 2020/0349365 A1* | 11/2020 | Behrendt | B60W 30/18163 |
| 2021/0227126 A1* | 7/2021 | Se | G06N 3/045 |

FOREIGN PATENT DOCUMENTS

| | | |
|---|---|---|
| EP | 3082067 A1 | 10/2016 |
| EP | 3358368 A1 | 8/2018 |
| JP | 2005-175603 A | 6/2005 |
| JP | 2006-047057 A | 2/2006 |
| JP | 2009-186353 A | 8/2009 |
| JP | 2016-206773 A | 12/2016 |
| WO | 2017/057041 A1 | 4/2017 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/045801 filed Nov. 22, 2019, which claims priority benefit of Japanese Patent Application No. JP 2018-230177 filed in the Japan Patent Office on Dec. 7, 2018. Each of the above-referenced applications is hereby incorporated herein by reference in its entirety.

TECHNICAL FIELD

The present disclosure relates to an information processing apparatus, an information processing method, and a program, and in particular, to an information processing apparatus, an information processing method, and a program that make it possible to properly acquire a location of a surrounding vehicle using three-dimensional detection information regarding an object around an own vehicle.

BACKGROUND ART

A technology used to perform automated driving has been proposed.

In order to perform automated driving, there is a need to recognize a surrounding state, to determine a traveling route for avoiding contact with another automobile or a pedestrian, and to move a vehicle.

With respect to a technology that performs recognition of a state of the surroundings of an own vehicle from among a series of movements necessary to perform automated driving, a technology is known that acquires information using a plurality of results of detections such as an object detection performed on the basis of an image captured by a camera, and three-dimensional detection information obtained by, for example, a millimeter-wave radar or LiDAR (light detection and ranging, laser imaging detection and ranging).

For example, a technology is disclosed that combines three-dimensional detection information obtained by, for example a radar with a result of an object recognition performed in a rectangular image captured by a camera (refer to Patent Literature 1).

CITATION LIST

Patent Literature

Patent Literature 1: Japanese Patent Application Laid-open No. 2005-175603

DISCLOSURE OF INVENTION

Technical Problem

However, the technology disclosed in Patent Literature 1 performs combining of three-dimensional detection information in a two-dimensional image. Thus, the three-dimensional detection information is treated as two-dimensional information, and there is a possibility that the location of an object will not be properly acquired.

Further, the three-dimensional detection information is detected as a surface distribution of a vehicle around an own automobile. Thus, it is difficult to properly specify the location of the surrounding vehicle using the three-dimensional detection information, since there is no information regarding a space in which the vehicle is situated.

The present disclosure has been made in view of the circumstances described above, and, in particular, the present disclosure makes it possible to properly acquire information regarding the of a vehicle in the surroundings, using three-dimensional detection information.

Solution to Problem

An image processing apparatus according to an aspect of the present disclosure is an image processing apparatus that includes an image-capturing section that captures an image of surroundings of an own automobile; a frame detector that detects a region of a vehicle in the image as a frame, the vehicle being in the surroundings of the own automobile; a three-dimensional information detector that detects three-dimensional information regarding an object in the surroundings of the own automobile; a three-dimensional box generator that generates a three-dimensional box on the basis of the three-dimensional information detected by the three-dimensional information detector, the three-dimensional box indicating a location of the vehicle in the surroundings of the own automobile; and a three-dimensional-box correction section that performs correction on the three-dimensional box on the basis of the frame.

An information processing method and a program according to the aspect of the present disclosure correspond to the information processing apparatus.

In the aspect of the present disclosure, an image of surroundings of an own automobile is captured; a region of a vehicle in the image is detected as a frame, the vehicle being in the surroundings of the own automobile; three-dimensional information regarding an object in the surroundings of the own automobile is detected; a three-dimensional box that indicates a location of the vehicle in the surroundings of the own automobile is generated on the basis of the detected three-dimensional information; and correction is performed on the three-dimensional box on the basis of the frame.

MODE(S) FOR CARRYING OUT THE INVENTION

Figure 1:
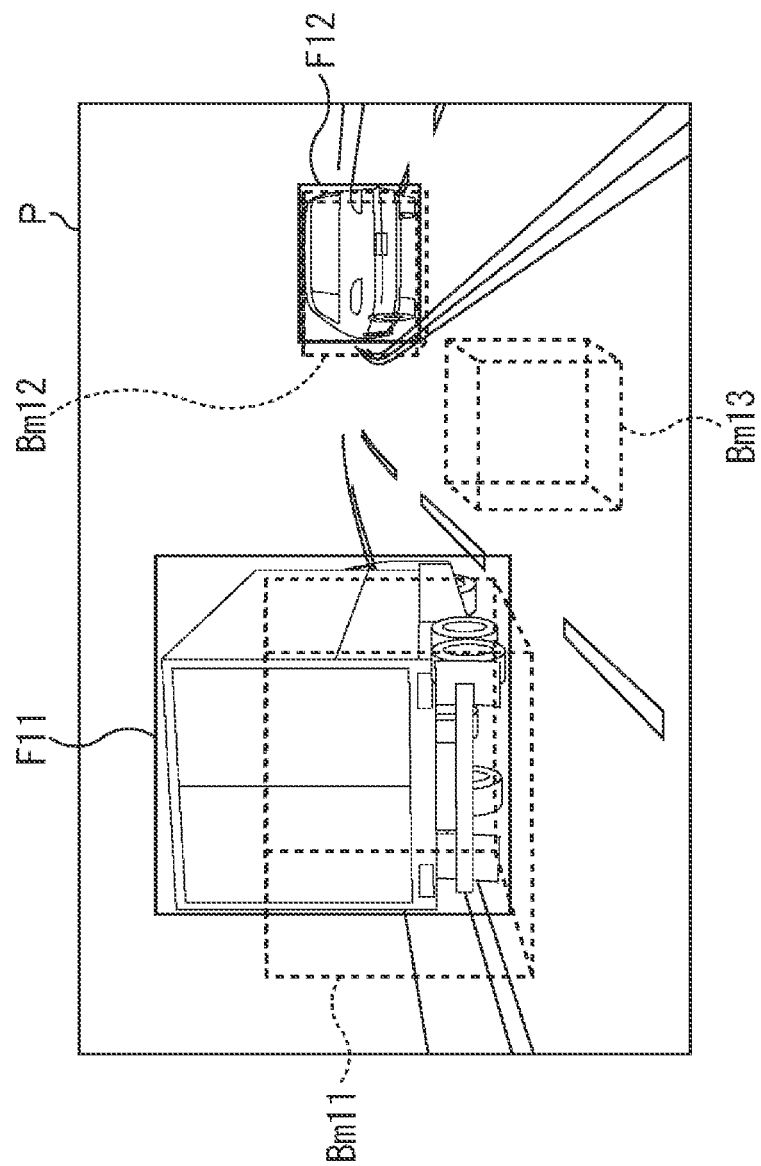
FIG. 1 illustrates an example of removing a ghost according to the present disclosure.

Favorable embodiments of the present disclosure will now be described below in detail with reference to the accompanying drawings. Note that, in the specification and the drawings, components having substantially the same functional configuration are denoted by the same reference numeral to omit a repetitive description.

Embodiments for carrying out the present technology are described below. The description is made in the following order.
1. Outline of Present Disclosure
2. Example of Configuration of Vehicle Control System That Controls Vehicle of Present Disclosure
3. Configuration in Which Three-Dimensional Box is Appropriately Acquired
4. Application Example
5. Example of Performing Series of Processes Using Software

1. Outline of Present Disclosure

<Measures Against False Detection of Three-Dimensional Location Information>

A vehicle control system of the present disclosure makes it possible to properly acquire three-dimensional location information regarding a vehicle, the three-dimensional location information regarding a vehicle being necessary to control automated driving.

An outline of the present disclosure is described.

The three-dimensional location information regarding a vehicle is, for example, information that represents the location of a vehicle around an own automobile using a three-dimensional box formed of squares, the location of a vehicle around an own automobile being obtained on the basis of a three-dimensional detection result detected by, for example, a millimeter-wave radar.

Here, the three-dimensional box represents a certain range in the form of a range formed of squares, the certain range including a distribution of one group. From among a distribution of a point at which a peak of a wave that is irradiated by a millimeter-wave radar to be reflected off a target object is detected, points that move in the same direction at the same speed are determined to be waves reflected off the same vehicle, and are classified into one group.

However, a result of detection obtained from an object other than a vehicle around an own automobile, such as a wall or a road surface, may be falsely detected as waves reflected off the vehicle, since a result of detection performed by a millimeter-wave radar is based on peaks of reflected waves.

Note that, hereinafter, a phenomenon in which a three-dimensional box is generated due to false detection in spite of there being no vehicle, is referred to as a ghost phenomenon, and the three-dimensional box generated due to false detection is referred to as a ghost.

Here, in the present disclosure, a result of an object recognition performed using an image captured by a camera is matched to a three-dimensional box, in order to suppress the occurrence of a ghost phenomenon. Then, a three-dimensional box to which no object recognition result is matched is determined to be a ghost to be removed, and this results in suppress the occurrence of a ghost phenomenon.

In other words, as shown in an image P of FIG. 1, frames F11 and F12 each represent a result of an object recognition performed on the basis of an image, the object recognition result indicating a vehicle. Further, on the basis of three-dimensional detection information, three-dimensional boxes Bm11 and Bm12 that each indicate that there is a vehicle are detected at locations, in FIG. 1, that respectively correspond to the frames F11 and F12.

In the case of FIG. 1, the frame F11 that is a result of an object recognition that is performed on the basis of an image to recognize a vehicle is matched to the three-dimensional box Bm11 that is based on a three-dimensional detection result and indicates a location of a vehicle. Thus, the three-dimensional box Bm11 can be determined to not be a ghost.

Likewise, the frame F12 that is a result of an object recognition that is performed on the basis of an image to recognize a vehicle is matched to the three-dimensional box Bm12 that is based on a three-dimensional detection result and indicates a location of a vehicle. Thus, the three-dimensional box Bm12 can be determined to not be a ghost.

On the other hand, a three-dimensional box Bm13 that is based on a three-dimensional detection result and indicates a location of a vehicle is generated in spite of there being no vehicle, and there is not a corresponding frame that is a result of an object recognition that is performed on the basis of an image to recognize a vehicle. Thus, the three-dimensional box Bm13 is determined to be a ghost, and excluded from a processing target.

Such processing makes it possible to remove a ghost, and to only leave a proper three-dimensional box.

<Correction Performed with Respect to Three-Dimensional Location Information>

A three-dimensional box is generated on the basis of a distribution of points of peaks of reflected waves of a millimeter-wave radar, as described above. Thus, when there is a vehicle MT such as a truck ahead on the right in a traveling direction of an own automobile, as shown in, for example, an image PA of FIG. 2, a point of a peak is represented by, for example, a circle in the figure, and a distribution of a point of a peak is concentrated on a left-side surface of the vehicle MT.

Figure 2:
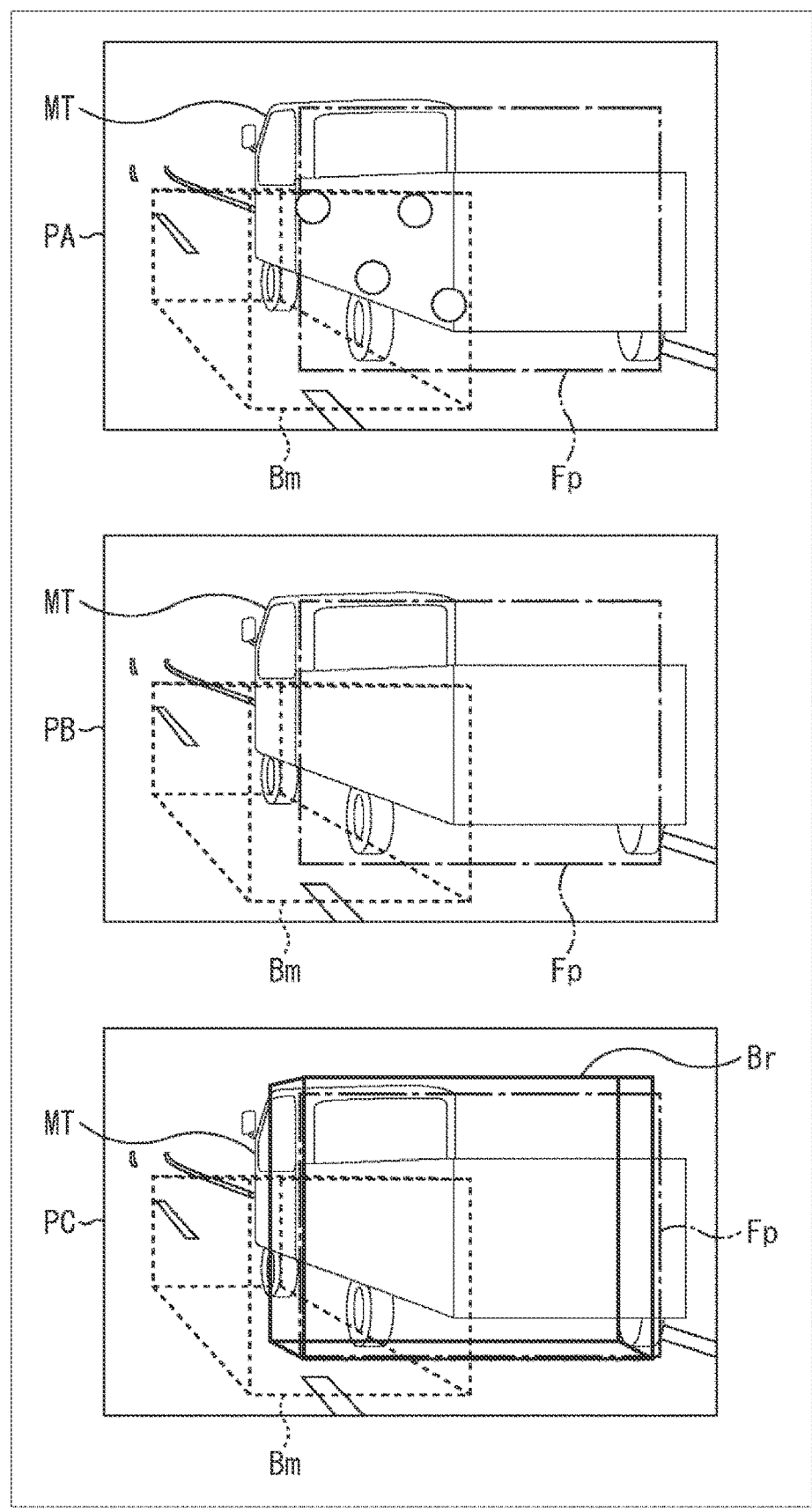
FIG. 2 is a diagram illustrating an outline of correction performed on a three-dimensional box of the present disclosure.

Thus, when a three-dimensional box Bm is generated on the basis of information regarding points of peaks distributed on the left-side surface of the vehicle MT, the three-dimensional box Bm is generated at a location offset in the left foreground of the figure from a location at which a body of the vehicle MT is actually present, as shown in an image PB of FIG. 2.

As described above, when the three-dimensional box Bm is generated at a location offset from a location at which a vehicle is actually present, a wrong positional relationship between an own automobile and the preceding vehicle MT is recognized. This may result in, for example, falsely detecting that the own automobile is approaching the vehicle MT, and thus in causing a malfunction due to sudden braking or a sudden turn of a steering wheel for collision avoidance.

Therefore, in the present disclosure, correction is performed by the three-dimensional box Bm being displaced to, for example, a location of a three-dimensional box Br indicated by a solid line, such that a location of the three-dimensional box Bm is within a frame Fp that is a result of an object recognition performed with respect to a vehicle on the basis of an image, as shown in an image Pc of FIG. 2. As a result of such processing, correction is performed such that the three-dimensional box Br of FIG. 2 is generated at a proper location at which the vehicle MT is present. This makes it possible to properly acquire a location of the vehicle MT on the basis of the three-dimensional box Br.

Accordingly, correction is performed on a three-dimensional box such that the three-dimensional box is generated at a location at which a vehicle is actually present, and this makes it possible to suppress a false detection.

Consequently, a three-dimensional box representing a surrounding vehicle can be generated at a location at which the surrounding vehicle has a proper positional relationship with an own automobile.

2. Example of Configuration of Vehicle Control System that Controls Vehicle of Present Disclosure Next, a vehicle control system for a vehicle of the present disclosure is described with reference to a block diagram of FIG. 3.

Figure 3:
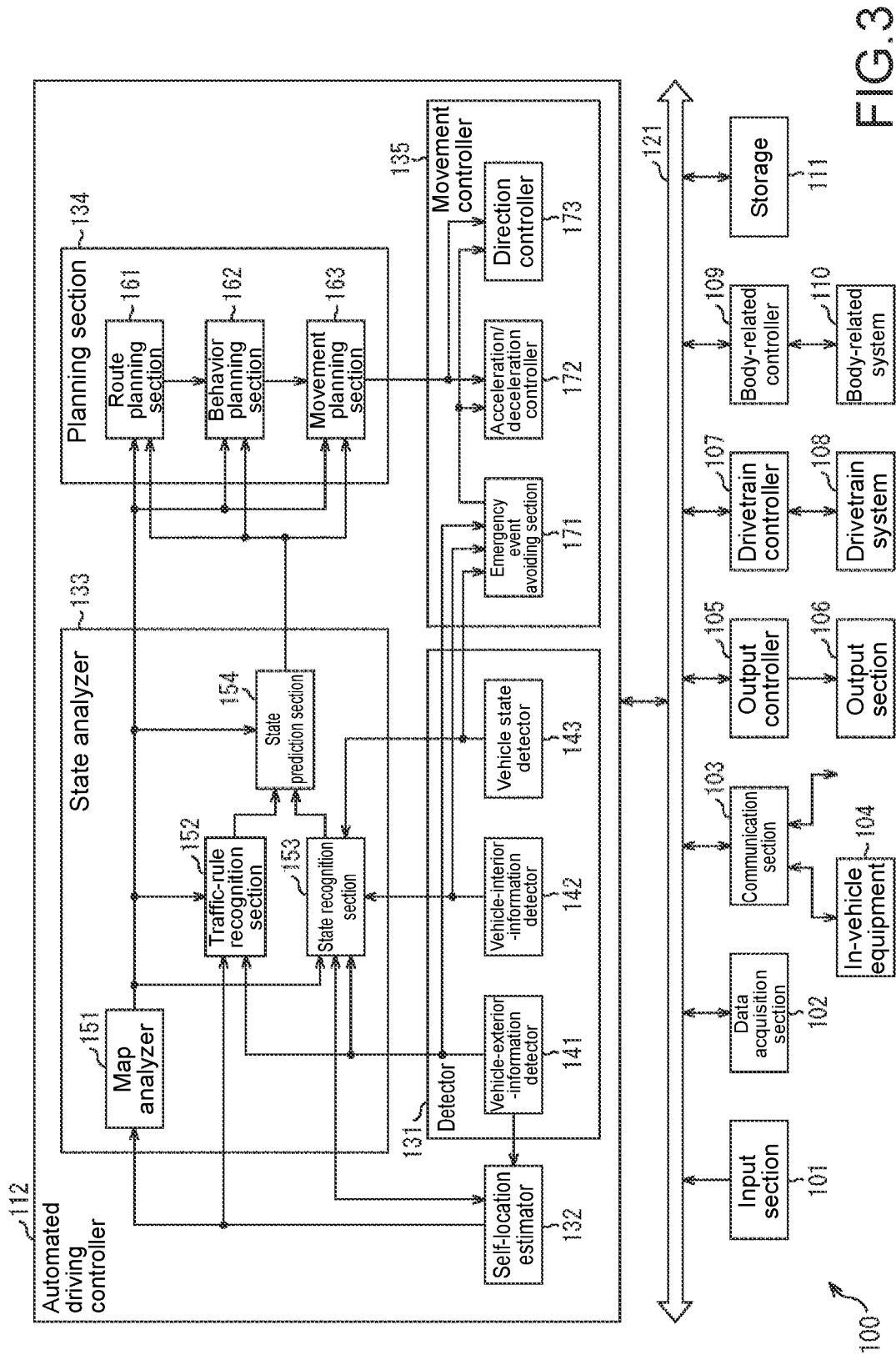
FIG. 3 is a block diagram illustrating an example of a configuration of a vehicle control system of the present disclosure.

FIG. 3 is a block diagram illustrating an example of a schematic functional configuration of a vehicle control system 100 that controls movement of the vehicle of the present disclosure.

Note that, when a vehicle provided with the vehicle control system 100 is to be distinguished from other vehicles, the vehicle provided with the vehicle control system 100 will be hereinafter referred to as an own automobile or an own vehicle.

The vehicle control system 100 includes an input section 101, a data acquisition section 102, a communication section 103, in-vehicle equipment 104, an output controller 105, an output section 106, a drivetrain controller 107, a drivetrain system 108, a body-related controller 109, a body-related system 110, a storage 111, and an automated driving controller 112. The input section 101, the data acquisition section 102, the communication section 103, the output controller 105, the drivetrain controller 107, the body-related controller 109, the storage 111, and the automated driving controller 112 are connected to each other through a communication network 121. For example, the communication network 121 includes a bus or a vehicle-mounted communication network compliant with any standard such as a controller area network (CAN), a local interconnect network (LIN), a local area network (LAN), or FlexRay (registered trademark). Note that the respective structural elements of the vehicle control system 100 may be directly connected to each other without using the communication network 121.

Note that the description of the communication network 121 will be omitted below when the respective structural elements of the vehicle control system 100 communicate with each other through the communication network 121. For example, when the input section 101 and the automated driving controller 112 communicate with each other through the communication network 121, it will be simply stated that the input section 101 and the automated driving controller 112 communicate with each other.

The input section 101 includes an apparatus used by a person on board to input various pieces of data, instructions, and the like. For example, the input section 101 includes an operation device such as a touch panel, a button, a microphone, a switch, and a lever; an operation device with which input can be performed by a method other than a manual operation, such as sound or a gesture; and the like. Alternatively, for example, the input section 101 may be externally connected equipment such as a remote-control apparatus using infrared or another radio wave, or mobile equipment or wearable equipment compatible with an operation of the vehicle control system 100. The input section 101 generates an input signal on the basis of data, an instruction, or the like input by a person on board, and supplies the generated input signal to the respective structural elements of the vehicle control system 100.

The data acquisition section 102 includes various sensors and the like for acquiring data used for a process performed by the vehicle control system 100, and supplies the acquired data to the respective structural elements of the vehicle control system 100.

For example, the data acquisition section 102 includes various sensors used to detect, for example, a state of the own automobile. Specifically, for example, the data acquisition section 102 includes a gyroscope; an acceleration sensor; an inertial measurement unit (IMU); and a sensor or the like used to detect an amount of operation of an accelerator pedal, an amount of operation of a brake pedal, a steering angle of a steering wheel, the number of revolutions of an engine, the number of revolutions of a motor, a speed of wheel rotation, or the like.

Further, for example, the data acquisition section 102 includes various sensors used to detect information regarding the outside of the own automobile. Specifically, for example, the data acquisition section 102 includes an image-capturing apparatus such as a time-of-flight (ToF) camera, a stereo camera, a monocular camera, an infrared camera, and other cameras. Furthermore, for example, the data acquisition section 102 includes an environment sensor used to detect weather, a meteorological phenomenon, or the like, and a surrounding-information detection sensor used to detect an object around the own automobile. For example, the environment sensor includes a raindrop sensor, a fog sensor, a sunshine sensor, a snow sensor, and the like. The surrounding-information detection sensor includes an ultrasonic sensor, a radar, LiDAR (light detection and ranging, laser imaging detection and ranging), a sonar, and the like.

Moreover, for example, the data acquisition section 102 includes various sensors used to detect the current location of the own automobile. Specifically, for example, the data acquisition section 102 includes, for example, a global navigation satellite system (GNSS) receiver that receives a GNSS signal from a GNSS satellite.

Further, for example, the data acquisition section 102 includes various sensors used to detect information regarding the inside of a vehicle. Specifically, for example, the data acquisition section 102 includes an image-capturing apparatus that captures an image of a driver, a biological sensor that detects biological information of the driver, a microphone that collects sound in the interior of a vehicle, and the like. For example, the biological sensor is provided to a seat surface, the steering wheel, or the like, and detects biological information of a person on board sitting on a seat, or a driver holding the steering wheel.

The communication section 103 communicates with the in-vehicle equipment 104 as well as various pieces of vehicle-exterior equipment, a server, a base station, and the like, transmits data supplied by the respective structural elements of the vehicle control system 100, and supplies the received data to the respective structural elements of the vehicle control system 100. Note that a communication protocol supported by the communication section 103 is not particularly limited. It is also possible for the communication section 103 to support a plurality of types of communication protocols.

For example, the communication section 103 wirelessly communicates with the in-vehicle equipment 104 using a wireless LAN, Bluetooth (registered trademark), near-field communication (NFC), a wireless USB (WUSB), or the like. Further, for example, the communication section 103 communicates with the in-vehicle equipment 104 by wire using a universal serial bus (USB), a high-definition multimedia interface (HDMI) (registered trademark), a mobile high-definition link (MHL), or the like through a connection terminal (not illustrated) (and a cable if necessary).

Further, for example, the communication section 103 communicates with equipment (for example, an application server or a control server) situated in an external network (for example, the Internet, a cloud network, or a carrier-specific network) through a base station or an access point. Furthermore, for example, the communication section 103 communicates with a terminal (for example, a terminal of a pedestrian or a store, or a machine-type communication (MTC) terminal) situated near the own automobile, using a peer-to-peer (P2P) technology. Moreover, for example, the communication section 103 performs V2X communication such as vehicle-to-vehicle communication, vehicle-to-infrastructure communication, vehicle-to-home communication between the own automobile and a home, and vehicle-to-pedestrian communication. Further, for example, the communication section 103 includes a beacon receiver, receives a radio wave or an electromagnetic wave transmitted from, for example, a radio station installed on a road, and acquires information regarding, for example, the current location, traffic congestion, traffic regulation, or a necessary time.

Examples of the in-vehicle equipment 104 include mobile equipment or wearable equipment of a person on board, information equipment that is brought in or attached to the own automobile, and a navigation apparatus that searches for a route to any destination.

The output controller 105 controls output of various pieces of information to a person on board of the own automobile or to the outside of the own automobile. For example, the output controller 105 generates an output signal that includes at least one of visual information (such as image data) or audio information (such as sound data), supplies the output signal to the output section 106, and thereby controls output of the visual information and the audio information from the output section 106. Specifically, for example, the output controller 105 combines pieces of data of images captured by different image-capturing apparatuses of the data acquisition section 102, generates a bird's-eye image, a panoramic image, or the like, and supplies an output signal including the generated image to the output section 106. Further, for example, the output controller 105 generates sound data including, for example, a warning beep or a warning message alerting a danger such as collision, contact, or entrance into a dangerous zone, and supplies an output signal including the generated sound data to the output section 106.

The output section 106 includes an apparatus capable of outputting the visual information or the audio information to a person on board of the own automobile or to the outside of the own automobile. For example, the output section 106 includes a display apparatus, an instrument panel, an audio speaker, headphones, a wearable device such as an eyeglass-type display used to be worn on the person on board, a projector, a lamp, and the like. Instead of an apparatus including a commonly used display, the display apparatus included in the output section 106 may be an apparatus, such as a head-up display, a transparent display, or an apparatus including an augmented reality (AR) display function, that displays the visual information in the field of view of a driver.

The drivetrain controller 107 generates various control signals, supplies them to the drivetrain system 108, and thereby controls the drivetrain system 108. Further, the drivetrain controller 107 supplies the control signals to the structural elements other than the drivetrain system 108 as necessary to, for example, notify them of a state of controlling the drivetrain system 108.

The drivetrain system 108 includes various apparatuses related to the drivetrain of the own automobile. For example, the drivetrain system 108 includes a driving force generation apparatus, such as an internal-combustion engine and a driving motor, that generates driving force, a driving force transmitting mechanism used to transmit the driving force to wheels, a steering mechanism that adjusts the steering angle, a braking apparatus that generates a braking force, an antilock braking system (ABS), an electronic stability control (ESC) system, an electric power steering apparatus, and the like.

The body-related controller 109 generates various control signals, supplies them to the body-related system 110, and thereby controls the body-related system 110. Further, the body-related controller 109 supplies the control signals to the structural elements other than the body-related system 110 as necessary to, for example, notify them of a state of controlling the body-related system 110.

The body-related system 110 includes various body-related apparatuses provided to a vehicle body. For example, the body-related system 110 includes a keyless entry system, a smart key system, a power window apparatus, a power seat, a steering wheel, an air conditioner, various lamps (such as a headlamp, a tail lamp, a brake lamp, a blinker, and a fog lamp), and the like.

For example, the storage 111 includes a read only memory (ROM), a random access memory (RAM), a magnetic storage device such as a hard disc drive (HDD), a semiconductor storage device, an optical storage device, a magneto-optical storage device, and the like. The storage 111 stores therein various programs, data, and the like that are used by the respective structural elements of the vehicle control system 100. For example, the storage 111 stores therein map data such as a three-dimensional high-accuracy map, a global map, and a local map. The high-accuracy map is a dynamic map or the like. The global map is less accurate and covers a wider area than the high-accuracy map. The local map includes information regarding the surroundings of the own automobile.

The automated driving controller 112 performs control related to automated driving such as autonomous traveling or a driving assistance. Specifically, for example, the automated driving controller 112 performs a cooperative control intended to implement a function of an advanced driver-assistance system (ADAS) including collision avoidance or shock mitigation for the own automobile, traveling after a leading vehicle based on a distance between vehicles, traveling while maintaining a vehicle speed, a warning of collision of the own automobile, a warning of deviation of the own automobile from a lane, and the like. Further, for example, the automated driving controller 112 performs a cooperative control intended to achieve, for example, automated driving that is autonomous traveling without an operation performed by a driver. The automated driving controller 112 includes a detector 131, a self-location estimator 132, a state analyzer 133, a planning section 134, and a movement controller 135.

The detector 131 detects various pieces of information necessary to control automated driving. The detector 131 includes a vehicle-exterior-information detector 141, a vehicle-interior-information detector 142, and a vehicle state detector 143.

The vehicle-exterior-information detector 141 performs a process of detecting information regarding the outside of the own automobile on the basis of data or a signal from each structural element of the vehicle control system 100. For example, the vehicle-exterior-information detector 141 performs processes of detecting, recognizing, and tracking an object around the own automobile, and a process of detecting a distance to the object. Examples of the detection-target object include a vehicle, a person, an obstacle, a structure, a road, a traffic light, a traffic sign, and a road sign. Further, for example, the vehicle-exterior-information detector 141 performs a process of detecting an environment surrounding the own automobile. Examples of the detection-target surrounding environment include weather, temperature, humidity, brightness, and a road surface condition. The vehicle-exterior-information detector 141 supplies data indicating a result of the detection process to, for example, the self-location estimator 132; a map analyzer 151, a traffic-rule recognition section 152, and a state recognition section 153 of the state analyzer 133; and an emergency event avoiding section 171 of the movement controller 135.

The vehicle-interior-information detector 142 performs a process of detecting information regarding the inside of a vehicle on the basis of data or a signal from each structural element of the vehicle control system 100. For example, the vehicle-interior-information detector 142 performs processes of authenticating and recognizing a driver, a process of detecting a state of the driver, a process of detecting a person on board, and a process of detecting a vehicle interior environment. Examples of the detection-target state of a driver include a physical condition, a degree of arousal, a degree of concentration, a degree of fatigue, and a direction of a line of sight. Examples of the detection-target vehicle interior environment include temperature, humidity, brightness, and odor. The vehicle-interior-information detector 142 supplies data indicating a result of the detection process to, for example, the state recognition section 153 of the state analyzer 133 and the emergency event avoiding section 171 of the movement controller 135.

The vehicle state detector 143 performs a process of detecting a state of the own automobile on the basis of data or a signal from each structural element of the vehicle control system 100. Examples of the detection-target state of the own automobile include speed, acceleration, a steering angle, the presence or absence of anomaly and its details, a driving operation state, a position and an inclination of a power seat, a state of a door lock, and states of other pieces of vehicle-mounted equipment. The vehicle state detector 143 supplies data indicating a result of the detection process to, for example, the state recognition section 153 of the state analyzer 133 and the emergency event avoiding section 171 of the movement controller 135.

The self-location estimator 132 performs a process of estimating a location, a posture, and the like of the own automobile on the basis of data or signals from the respective structural elements of the vehicle control system 100, such as the vehicle-exterior-information detector 141, and the state recognition section 153 of the state analyzer 133. Further, the self-location estimator 132 generates, as necessary, a local map (hereinafter referred to as a self-location estimation map) used to estimate a self-location. For example, the self-location estimation map is a high-accuracy map using a technology such as simultaneous localization and mapping (SLAM). The self-location estimator 132 supplies data indicating a result of the estimation process to, for example, the map analyzer 151, the traffic-rule recognition section 152, and the state recognition section 153 of the state analyzer 133. Further, the self-location estimator 132 stores the self-location estimation map in the storage 111.

The state analyzer 133 performs a process of analyzing states of the own automobile and its surroundings. The state analyzer 133 includes the map analyzer 151, the traffic-rule recognition section 152, the state recognition section 153, and a state prediction section 154.

Using, as necessary, data or signals from the respective structural elements of the vehicle control system 100, such as the self-location estimator 132 and the vehicle-exterior-information detector 141, the map analyzer 151 performs a process of analyzing various maps stored in the storage 111, and constructs a map including information necessary for an automated driving process. The map analyzer 151 supplies the constructed map to, for example, the traffic-rule recognition section 152, the state recognition section 153, and the state prediction section 154, as well as a route planning section 161, a behavior planning section 162, and a movement planning section 163 of the planning section 134.

The traffic-rule recognition section 152 performs a process of recognizing traffic rules around the own automobile on the basis of data or signals from the respective structural elements of the vehicle control system 100, such as the self-location estimator 132, the vehicle-exterior-information detector 141, and the map analyzer 151. The recognition process makes it possible to recognize a location and a state of a traffic light around the own automobile, the details of traffic control performed around the own automobile, and a travelable lane. The traffic-rule recognition section 152 supplies data indicating a result of the recognition process to, for example, the state prediction section 154.

The state recognition section 153 performs a process of recognizing a state related to the own automobile on the basis of data or signals from the respective structural elements of the vehicle control system 100, such as the self-location estimator 132, the vehicle-exterior-information detector 141, the vehicle-interior-information detector 142, the vehicle state detector 143, and the map analyzer 151. For example, the state recognition section 153 performs a process of recognizing a state of the own automobile, a state of the surroundings of the own automobile, a state of a driver of the own automobile, and the like. Further, the state recognition section 153 generates, as necessary, a local map (hereinafter referred to as a state recognition map) used to recognize the state of the surroundings of the own automobile. The state recognition map is, for example, an occupancy grid map.

Examples of the recognition-target state of the own automobile include a location, a posture, and movement (such as speed, acceleration, and a movement direction) of the own automobile, as well as the presence or absence of anomaly and its details. Examples of the recognition-target state of the surroundings of the own automobile include the type and a location of a stationary object around the own automobile; the type, a location, and movement (such as speed, acceleration, and a movement direction) of a moving object around the own automobile; a structure of a road around the own automobile and a condition of the surface of the road; and weather, temperature, humidity, and brightness around the own automobile. Examples of the recognition-target state of a driver include a physical condition, a degree of arousal, a degree of concentration, a degree of fatigue, movement of a line of sight, and a driving operation.

The state recognition section 153 supplies data indicating a result of the recognition process (including a state recognition map as necessary) to, for example, the self-location estimator 132 and the state prediction section 154. Further, the state recognition section 153 stores the state-recognition map in the storage 111.

The state prediction section 154 performs a process of predicting a state related to the own automobile on the basis of data or signals from the respective structural elements of the vehicle control system 100, such as the map analyzer 151, the traffic-rule recognition section 152, and the state recognition section 153. For example, the state prediction section 154 performs a process of predicting a state of the own automobile, a state of the surroundings of the own automobile, a state of a driver, and the like.

Examples of the prediction-target state of the own automobile include the behavior of the own automobile, the occurrence of anomaly in the own automobile, and a travelable distance of the own automobile. Examples of the prediction-target state of the surroundings of the own automobile include the behavior of a moving object, a change in a state of a traffic light, and a change in environment such as weather around the own automobile. Examples of the prediction-target state of a driver include the behavior and the physical condition of the driver.

The state prediction section 154 supplies data indicating a result of the prediction process to, for example, the route planning section 161, the behavior planning section 162, and the movement planning section 163 of the planning section 134 together with the data from the traffic-rule recognition section 152 and the state recognition section 153.

The route planning section 161 plans a route to a destination on the basis of data or signals from the respective structural elements of the vehicle control system 100, such as the map analyzer 151 and the state prediction section 154. For example, the route planning section 161 sets a route from the current location to a specified destination on the basis of a global map. Further, for example, the route planning section 161 changes a route as appropriate on the basis of the states of, for example, traffic congestion, an accident, traffic regulation, and a construction, as well as the physical condition of a driver. The route planning section 161 supplies data indicating the planned route to, for example, the behavior planning section 162.

On the basis of data or signals from the respective structural elements of the vehicle control system 100, such as the map analyzer 151 and the state prediction section 154, the behavior planning section 162 plans the behavior of the own automobile in order for the own automobile to travel safely on the route planned by the route planning section 161 within a time planned by the route planning section 161. For example, the behavior planning section 162 makes plans about, for example, a start to move, a stop, a travel direction (such as a forward movement, a backward movement, a left turn, a right turn, and a change in direction), a lane for traveling, a traveling speed, and passing. The behavior planning section 162 supplies data indicating the planned behavior of the own automobile to, for example, the movement planning section 163.

On the basis of data or signals from the respective structural elements of the vehicle control system 100, such as the map analyzer 151 and the state prediction section 154, the movement planning section 163 plans movement of the own automobile in order to achieve the behavior planned by the behavior planning section 162. For example, the movement planning section 163 makes plans about, for example, acceleration, deceleration, and a traveling course. The movement planning section 163 supplies data indicating the planned movement of the own automobile to, for example, an acceleration/deceleration controller 172 and a direction controller 173 of the movement controller 135.

The movement controller 135 controls movement of the own automobile. The movement controller 135 includes the emergency event avoiding section 171, the acceleration/deceleration controller 172, and the direction controller 173.

On the basis of a result of the detections performed by the vehicle-exterior-information detector 141, the vehicle-interior-information detector 142, and the vehicle state detector 143, the emergency event avoiding section 171 performs a process of detecting emergency events such as collision, contact, entrance into a dangerous zone, something unusual in a driver, and anomaly in the vehicle. When the emergency event avoiding section 171 detects the occurrence of an emergency event, the emergency event avoiding section 171 plans movement of the own automobile such as a sudden stop or a quick turning for avoiding the emergency event. The emergency event avoiding section 171 supplies data indicating the planned movement of the own automobile to, for example, the acceleration/deceleration controller 172 and the direction controller 173.

The acceleration/deceleration controller 172 controls acceleration/deceleration to achieve the movement of the own automobile planned by the movement planning section 163 or the emergency event avoiding section 171. For example, the acceleration/deceleration controller 172 computes a control target value for a driving force generation apparatus or a braking apparatus to achieve the planned acceleration, the planned deceleration, or the planned sudden stop, and supplies a control instruction indicating the computed control target value to the drivetrain controller 107.

The direction controller 173 controls a direction to achieve the movement of the own automobile planned by the movement planning section 163 or the emergency event avoiding section 171. For example, the direction controller 173 computes a control target value for a steering mechanism to achieve the traveling course planned by the movement planning section 163 or the quick turning planned by the emergency event avoiding section 171, and supplies a control instruction indicating the computed control target value to the drivetrain controller 107.

3. Configuration in which Three-Dimensional Box is Properly Acquired

Figure 4:
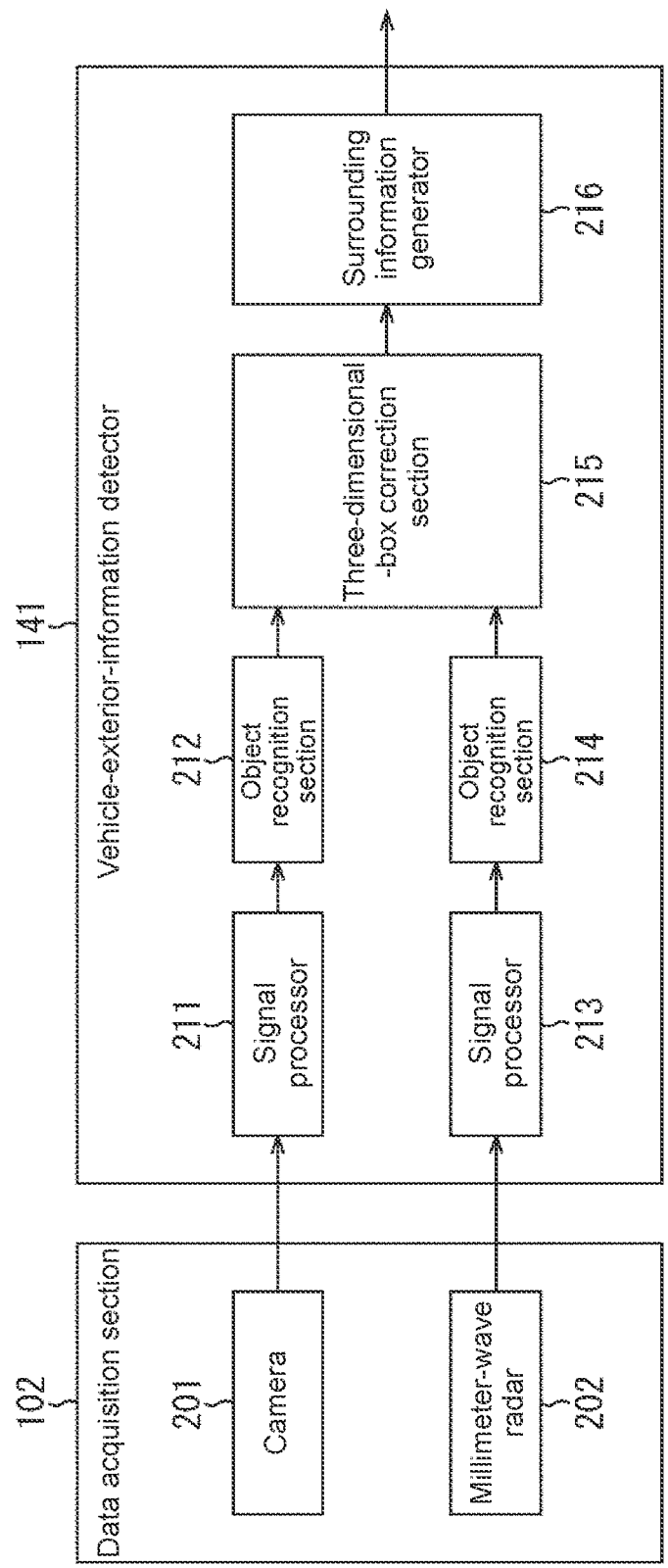
FIG. 4 is a block diagram illustrating an example of a configuration of a vehicle-exterior-information detector in which a three-dimensional box is properly acquired.

Next, a configuration in which a three-dimensional box is properly acquired is described with reference to a block diagram of FIG. 4. Note that, from among the example of the functional configuration implementing the vehicle control system 100 described with reference to FIG. 3, FIG. 4 illustrates a configuration that is used to properly acquire a three-dimensional box, and includes data acquisition section 102 and vehicle-exterior-information detector 141.

The data acquisition section 102 includes a camera 201 and a millimeter-wave radar 202. Both the camera 201 and the millimeter-wave radar 202 detect an object in a region situated ahead in a traveling direction of the vehicle 11, such as a region situated ahead of the vehicle 11 and an upper portion of a windshield of the vehicle 11.

The camera 201 captures an image of a region situated ahead in the traveling direction, and outputs the captured image to the vehicle-exterior-information detector 141 of the detector 131 in the automated driving controller 112.

The millimeter-wave radar 202 irradiates radio waves in the millimeter-wave band onto the region situated ahead in the traveling direction, receives the waves reflected off an object, and outputs a distribution of reception results as a three-dimensional detection result to the vehicle-exterior-information detector 141 of the detector 131 in the automated driving controller 112, the reception results being formed of peaks of the reflected waves.

On the basis of an image captured by the camera 201 and a result of a three-dimensional detection performed by the millimeter-wave radar 202, the vehicle-exterior-information detector 141 recognizes an object situated ahead of the vehicle 11, and generates surrounding information on the basis of a result of the recognition, the surrounding information including location information regarding a vehicle around the own automobile.

More specifically, the vehicle-exterior-information detector 141 includes a signal processor 211, an object recognition section 212, a signal processor 213, an object recognition section 214, a three-dimensional-box correction section 215, and a surrounding information generator 216.

On the basis of a signal of an image captured by the camera 201, the signal processor 211 performs, for example, demosaic processing, denoising, and a tone correction with respect to respective colors of red, green, and blue, and generates the image to output the generated image to the object recognition section 212.

On the basis of the image output by the signal processor 211, the object recognition section 212 recognizes, for each pixel, an object that appears in the image, using, for example, semantic segmentation. Further, from among object recognition results, the object recognition section 212 outputs information regarding a frame (a region) determined to be a vehicle to the three-dimensional-box correction section 215. Here, the frame corresponds to, for example, the frames F11 and F12 of FIG. 1.

The signal processor 213 generates three-dimensional detection information including a distance, a speed, and a movement direction (angle) on the basis of a reception result including a distribution of reflected waves with peak intensity, the reflected waves with peak intensity being waves in the millimeter-wave band that are irradiated by the millimeter-wave radar 202 and being a result of detection performed by the millimeter-wave radar 202. The signal processor 213 outputs the three-dimensional detection information to the object recognition section 214.

On the basis of the three-dimensional detection information output by the signal processor 213, the object recognition section 214 performs grouping with respect to a distribution of group-of-points information that is the three-dimensional detection information, such that pieces of group-of-points information of the same speed, the same distance, and the same movement direction (angle) are classified into one group. The object recognition section 214 specifies, as a three-dimensional box indicating a range in which there is a vehicle, a range that is formed of squares and includes a distribution of the pieces of group-of-points information classified into one group. The object recognition section 214 outputs the three-dimensional box to the three-dimensional-box correction section 215. Here, the three-dimensional box is, for example, the three-dimensional boxes Bm11 and Bm12 of FIG. 1.

The three-dimensional-box correction section 215 performs correction with respect to location information regarding the three-dimensional box supplied by the object recognition section 214, on the basis of the information regarding a frame that is supplied by the object recognition section 212, and outputs location information obtained by the correction to the surrounding information generator 216.

More specifically, the three-dimensional-box correction section 215 matches a three-dimensional box and a frame to extract a three-dimensional box that is present at the same location as a frame, and removes, as a ghost, a three-dimensional box other than the extracted three-dimensional box.

The three-dimensional-box correction section 215 obtains a lap rate for each pair of a three-dimensional box and a frame, and determines that a three-dimensional box and a frame of a pair for which a lap rate is higher than a specified lap rate are matched to each other.

Figure 5:
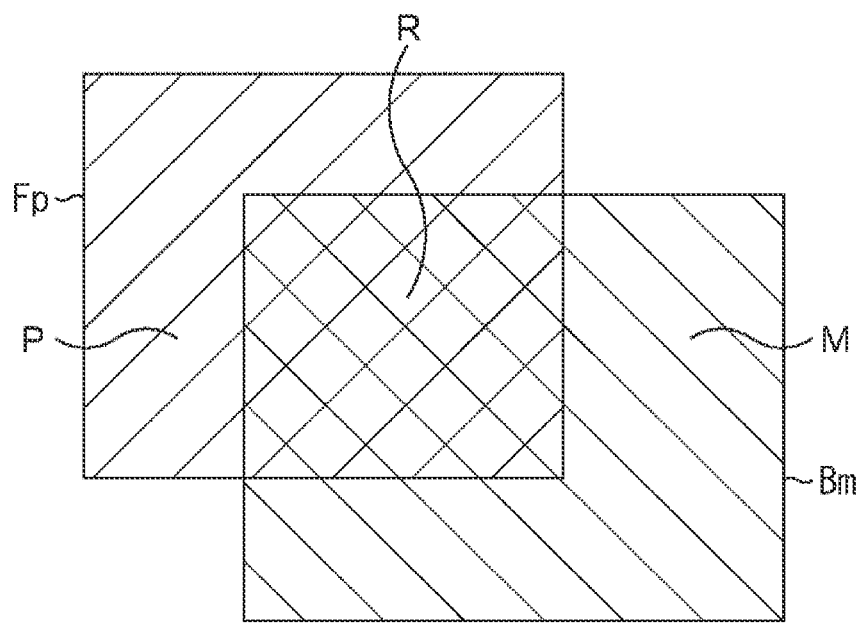
FIG. 5 is a block diagram describing a lap rate.

Here, the lap rate is a proportion of the area of a shared range to the total area of a region occupied by a three-dimensional box and a frame in a two-dimensional image, that is, a proportion of an overlap. The lap rate for the three-dimensional box Bm and the frame Fp illustrated in FIG. 5 is calculated using Formula (1) indicated below.

$$Rr = R/(P+M-R) \qquad (1)$$

Here, Rr represents a lap rate, M represents the area of a region, in an image, in which there is the three-dimensional box Bm (two-dimensional area), P represents the area of the frame Fp, and R represents the area of a range in which the three-dimensional box Bm and the frame Fp overlap.

The three-dimensional-box correction section 215 searches for a pair of a three-dimensional box and a frame that at least partially overlap, and calculates a lap rate for an obtained pair. When the lap rate exhibits a value larger than a specified value, the three-dimensional-box correction section 215 determines that the three-dimensional box of the pair is not a ghost, but is a three-dimensional box corresponding to the location of a vehicle.

Then, the three-dimensional-box correction section 215 performs correction on a three-dimensional box recognized as being paired with a frame, such that the three-dimensional box is within the frame.

Figure 6:
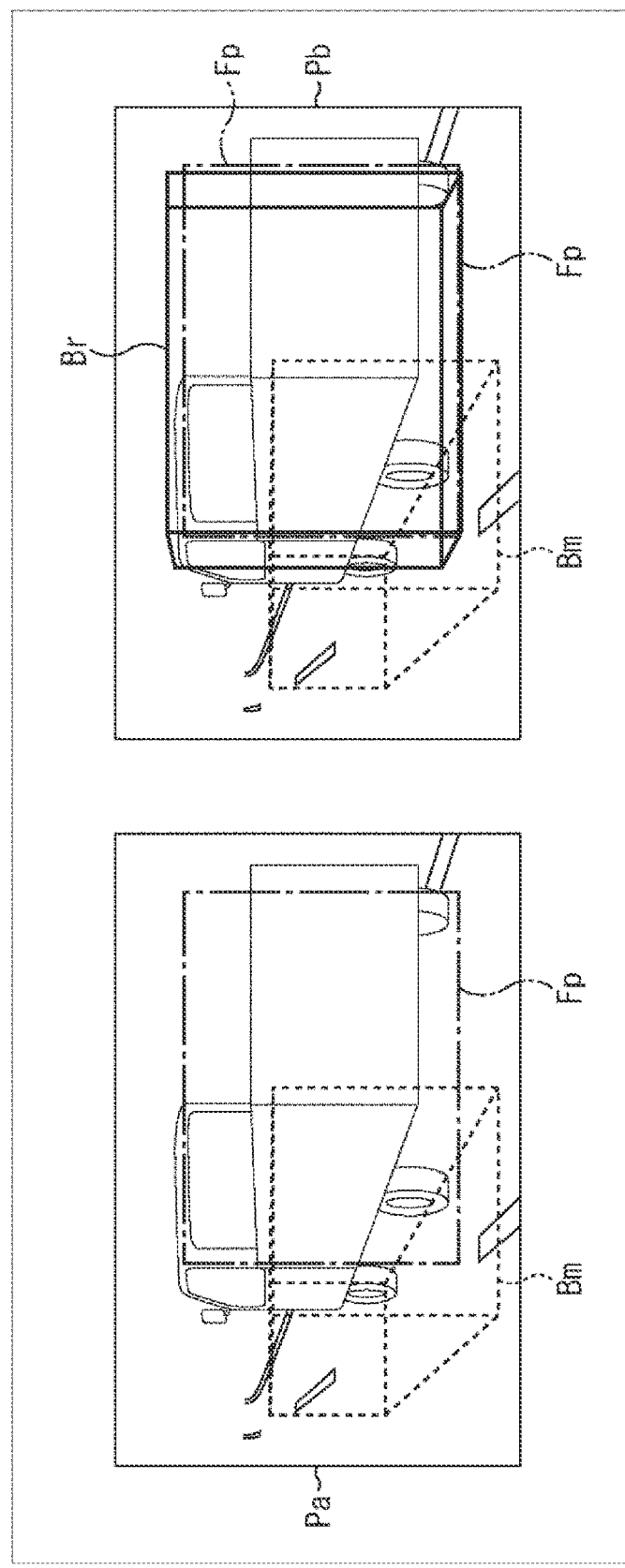
FIG. 6 is a diagram illustrating an example of performing correction on a three-dimensional box.

In other words, when it has been confirmed that the lap rate for a three-dimensional box Bm and a frame Fp that are shown in an image Pa of FIG. 6 exhibits a value larger than a specified value, and the three-dimensional box Bm and the frame Fp are paired with each other, correction is performed on the three-dimensional box Bm such that the three-dimensional box Bm is within the frame Fp, and a three-dimensional box Br is generated, as shown in an image Pb of FIG. 6.

A three-dimensional box obtained on the basis of a result of detection performed by the millimeter-wave radar 202 is highly accurate in the distance direction, but is less accurate in the horizontal direction and in the vertical direction. On the other hand, a frame based on an image captured by the camera 201 is obtained with a high degree of accuracy in the horizontal direction and in the vertical direction, but information in the distance direction is not obtained.

Thus, when the three-dimensional-box correction section 215 performs correction on the three-dimensional box Bm to obtain the three-dimensional box Br, the three-dimensional-box correction section 215 performs correction with respect to the horizontal direction and the vertical direction, using information in an image, such that the entirety of the three-dimensional box is within the frame Fp.

Figure 7:
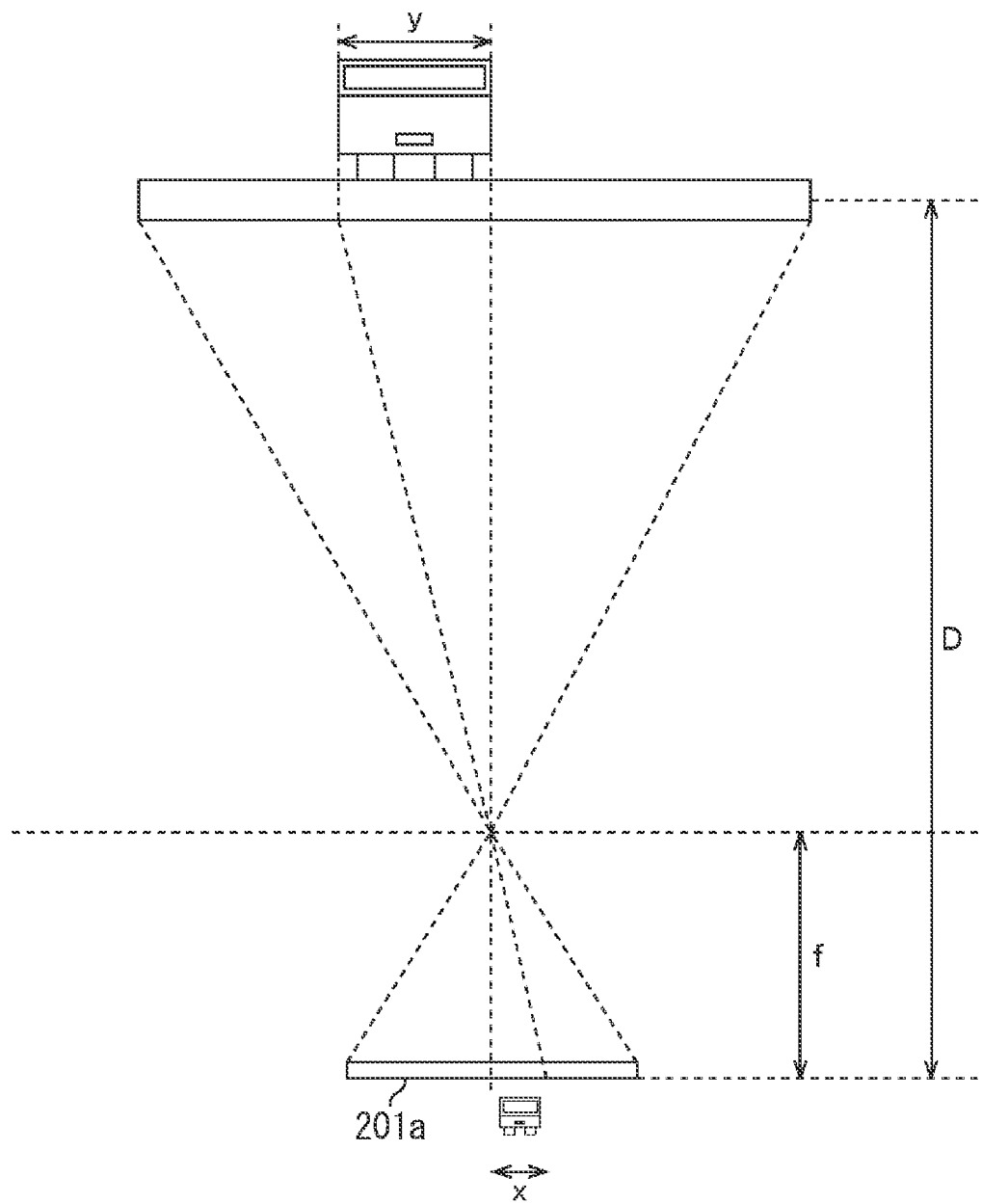
FIG. 7 is a diagram illustrating an example of a method for correcting for the width of a three-dimensional box in the horizontal direction.

More specifically, with respect to the horizontal direction, when x represents a width (the number of pixels) of an object recognized as a vehicle, the width x being a width on an image-capturing surface 201a of the camera 201, y representing an actual width of the object recognized as the vehicle can be obtained using Formula (2) indicated below on the basis of a relationship between a distance D to another automobile and a focal length f, as illustrated in FIG. 7.

$$y = D \times x / f \quad (2)$$

Here, in Formula (2), y represents an actual width of an object recognized as a vehicle (another automobile), D represents a distance from an own automobile to the other automobile that is obtained on the basis of a result of detection performed by the millimeter-wave radar 202, x represents a width (the number of pixels) on the image-capturing surface of the camera 201, and f represents a focal length of an optical system (a lens) (not illustrated) that is used for the camera 201.

Figure 8:
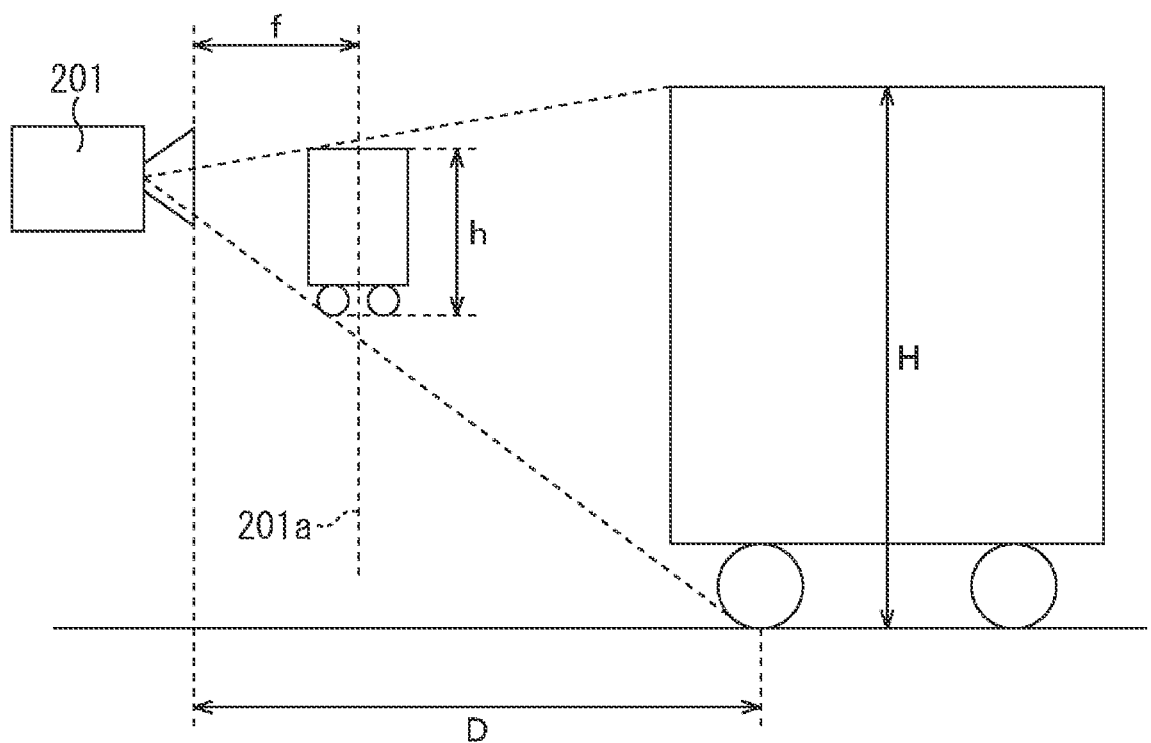
FIG. 8 is a diagram illustrating an example of a method for correcting for the height of a three-dimensional box in the vertical direction.

Likewise, with respect to the vertical direction, when h represents a height (the number of pixels) of an object recognized as a vehicle, the height h being a height on the image-capturing surface 201a of the camera 201 and being measured from a boundary between the object and a road surface, H representing an actual height of the object recognized as the vehicle can be obtained using Formula (3) indicated below on the basis of a relationship between a distance D to another automobile and a focal length f, as illustrated in FIG. 8.

$$H = D \times h / f \quad (3)$$

Here, in Formula (3), H represents an actual height of an object recognized as a vehicle (another automobile), D represents a distance from an own automobile to the other automobile that is obtained on the basis of a result of detection performed by the millimeter-wave radar 202, h represents a height (the number of pixels) on the image-capturing surface of the camera 201, the height h being measured from a boundary between the other automobile and a road surface, and f represents a focal length of an optical system (a lens) (not illustrated) that is used for the camera 201.

In other words, on the basis of a cross-sectional surface obtained on the basis of a width of a vehicle in the horizontal direction and a height of the vehicle in the vertical direction using Formulas (2) and (3) described above, and on the basis of information regarding a distance (depth) that is obtained from a result of detection performed by the millimeter-wave radar 202, correction is performed on a three-dimensional box Bm such that the three-dimensional box Bm is within a frame Fp obtained by an image, and thus a three-dimensional box Br is obtained.

Other Examples of Frame

The example in which a frame indicates a region in which an object recognition result in an image captured by the camera 201 is a vehicle, has been described above. However, a region in which there is a three-dimensional box obtained on the basis of a two-dimensional image may be used as a frame.

For example, 3D Boundary Box Vehicle Detection manufactured by Mobileye Corporation (registered trademark) (refer to https://www.mobileye.com/our-technology/) is known as a technology used to obtain, as a three-dimensional box, three-dimensional detection information recognized as a vehicle, using a two-dimensional image.

Figure 9:
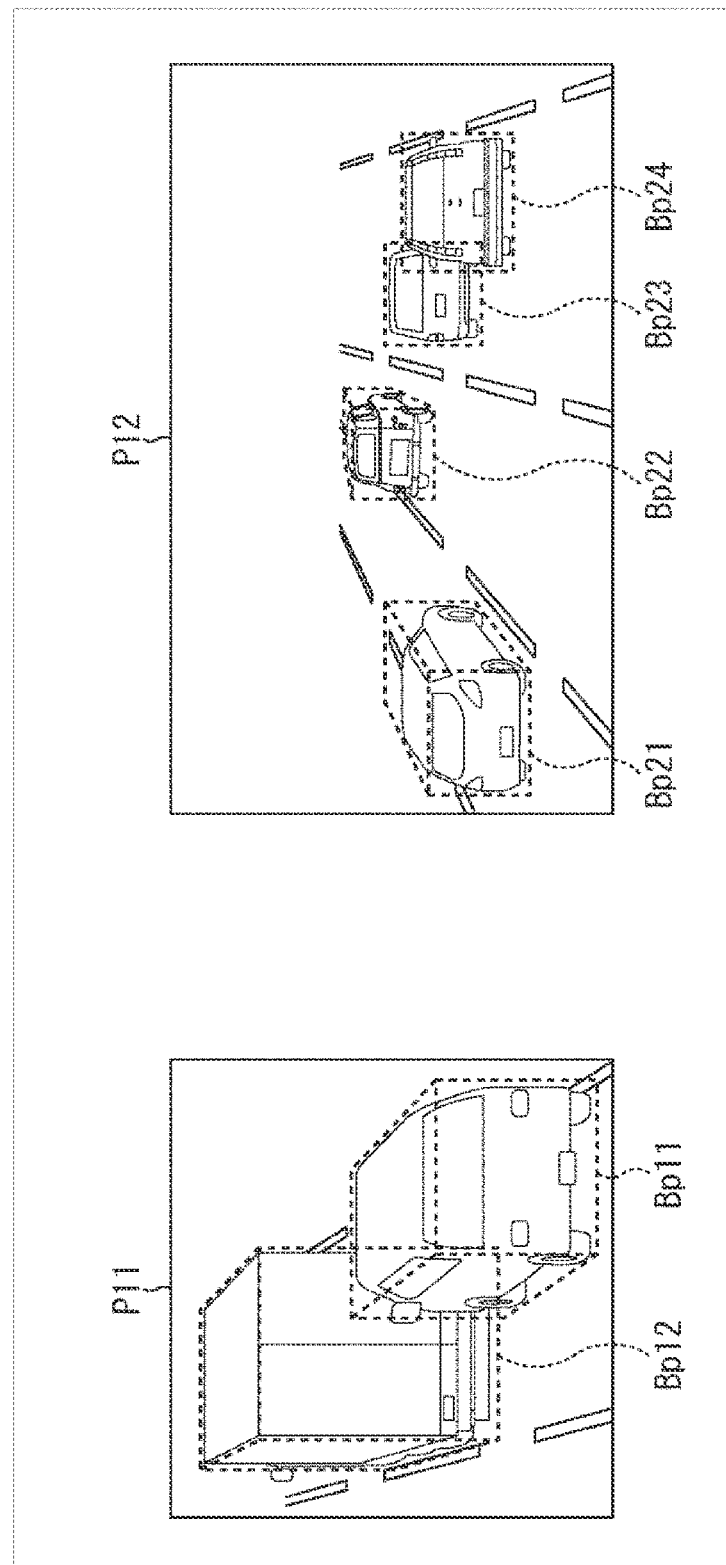
FIG. 9 is a diagram illustrating examples of a three-dimensional box obtained on the basis of a two-dimensional image.

When three-dimensional detection information recognized as a vehicle is obtained as a three-dimensional box, using a two-dimensional image, three-dimensional boxes Bp11 and Bp12 are each obtained at a location at which there is a vehicle, only using information in an image, as shown in, for example, an image P11 of FIG. 9. Further, three-dimensional boxes Bp21 to Bp24 are each obtained at a location at which there is a vehicle, only using information in an image, as shown in, for example, an image P12 of FIG. 9.

However, when a three-dimensional box is obtained only using a two-dimensional image, a range in which there is a vehicle is estimated from a two-dimensional image captured by a monocular camera to generate a three-dimensional box. This results in a lower degree of accuracy, compared to the distance accuracy provided by a millimeter-wave radar.

Thus, in the present disclosure, the three-dimensional-box correction section 215 performs correction such that a three-dimensional box obtained on the basis of a result of detection performed by the millimeter-wave radar 202 is within a region in an image captured by the camera 201 (a region in a two-dimensional image), the region being a region of a three-dimensional box obtained on the basis of the image.

In other words, the three-dimensional-box correction section 215 of the present disclosure generally performs correction on a three-dimensional box obtained on the basis of a result of detection performed by the millimeter-wave radar 202, such that the three-dimensional box is within a region, in a two-dimensional image captured by the camera 201, in which there is a vehicle, or a region of a three-dimensional box in the two-dimensional image.

Such processing results in combining information regarding an image captured by the camera 201 with a result of detection performed by the millimeter-wave radar 202, the information regarding an image being highly accurate in the horizontal direction and the vertical direction, the detection result being highly accurate in distance. This makes it possible to obtain a highly accurate three-dimensional box.

The surrounding information generator 216 generates surrounding information on the basis of information regarding a three-dimensional box that is supplied by the three-dimensional-box correction section 215, and outputs the surrounding information.

Figure 10:
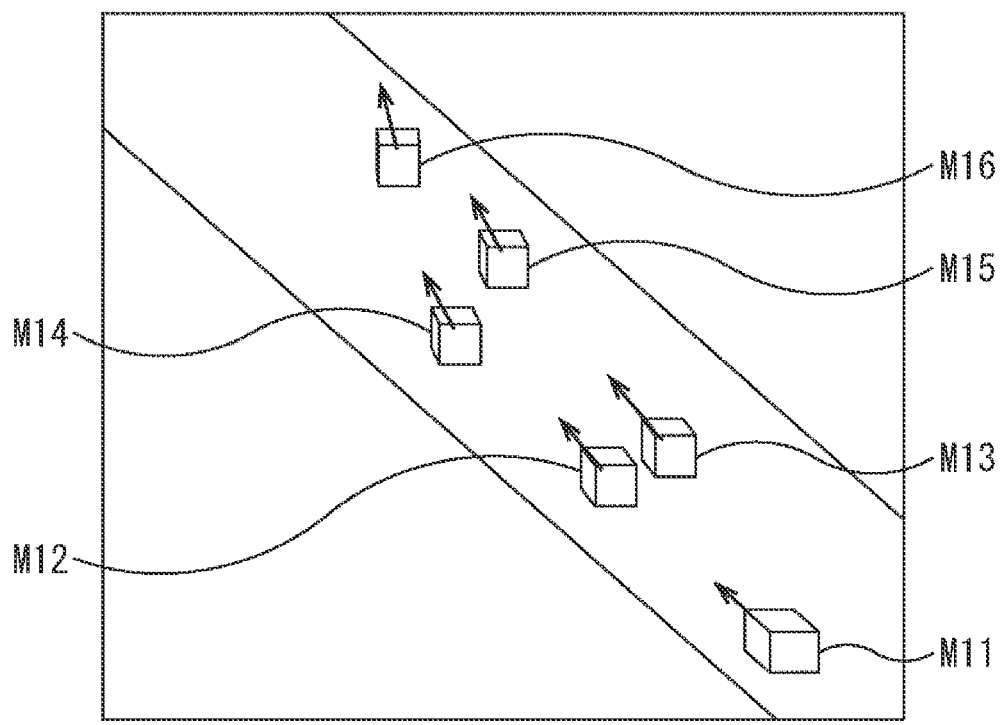
FIG. 10 is a diagram illustrating an example of surrounding information using a three-dimensional box.

The surrounding information is information that indicates a positional relationship between an own automobile and another automobile around the own automobile, and is, for example, information illustrated in FIG. 10.

In other words, a three-dimensional box M11 that indicates an own automobile, and three-dimensional boxes M12 to M16 that each indicate another automobile around the own automobile are given in the surrounding information of FIG. 10, where each of the three-dimensional boxes M12 to M16 is given an arrow that indicates a traveling direction.

The arrow is set by an average of information regarding a speed and a direction in a distribution obtained by classifying detection results of the same speed, the same location, and the same direction into one group, the detection result being a result of detection performed by the millimeter wave radar 202.

On the output side of the vehicle-exterior-information detector 141, a collision determination and the like depending on a distance to a surrounding vehicle are performed on the basis of the surrounding information, and thus automated driving is controlled.

<Surrounding Information Generating Processing>

Figure 11:
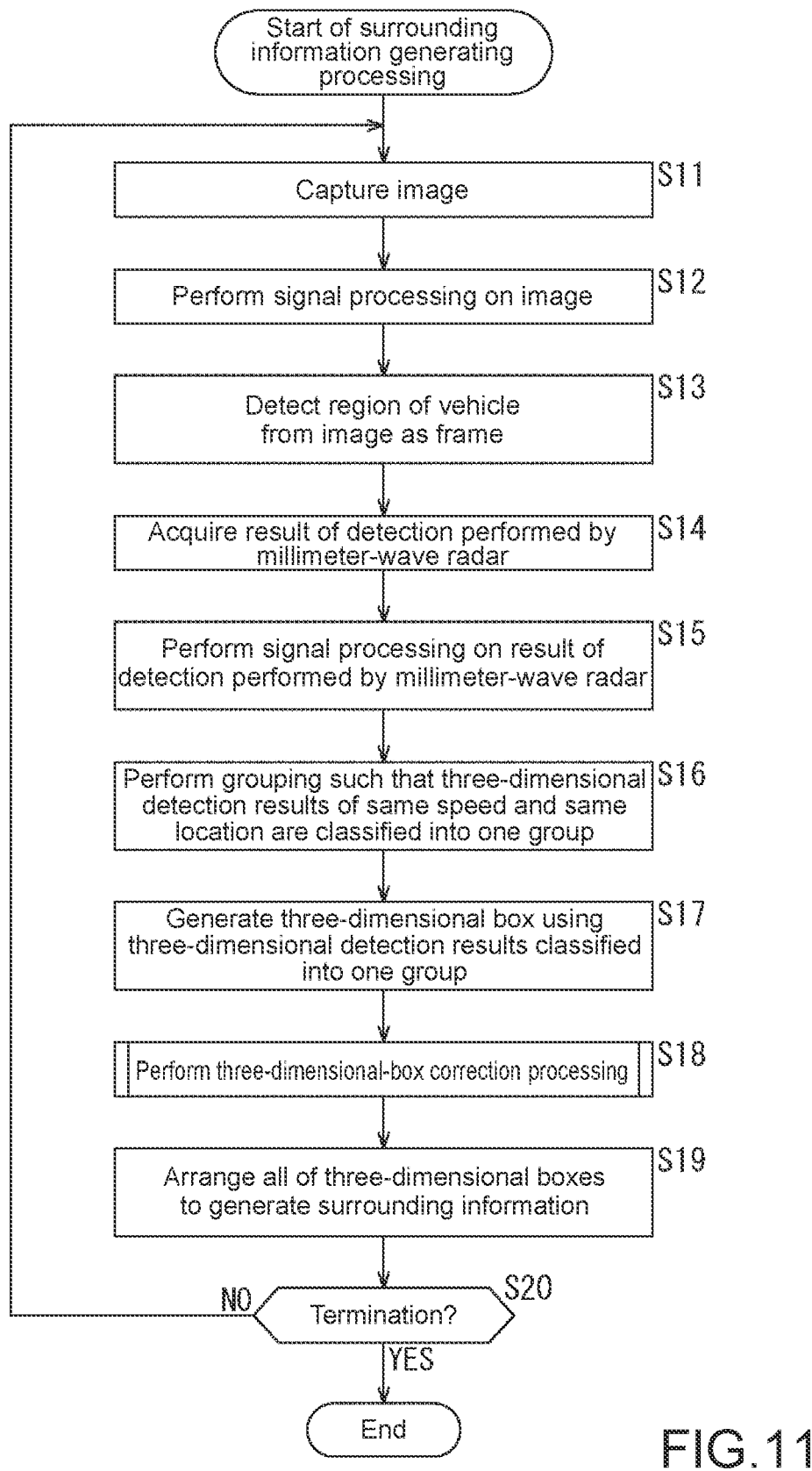
FIG. 11 is a flowchart illustrating surrounding information generating processing.

Next, surrounding information generating processing is described with reference to a flowchart of FIG. 11.

In Step S11, the camera 201 captures an image of a specified region situated ahead in a traveling direction, and outputs the image in the form of an image signal to the vehicle-exterior-information detector 141.

In Step S12, on the basis of the signal of the image captured by the camera 201, the signal processor 211 of the vehicle-exterior-information detector 141 performs, for example, demosaic processing, denoising, and a tone correction with respect to respective colors of red, green, and blue, and generates an image to output the generated image to the object recognition section 212.

In Step S13, on the basis of the image output by the signal processor 211, the object recognition section 212 recognizes, for each pixel, what an object that appears in the image is, using, for example, semantic segmentation. Further, from among object recognition results, the object recognition section 212 outputs information regarding a frame (a region) determined to be a vehicle to the three-dimensional-box correction section 215.

In Step S14, the millimeter-wave radar 202 irradiates radio waves in the millimeter-wave band onto the specified region situated ahead in the traveling direction, and outputs a three-dimensional detection result including a distribution of reflected waves with peak intensity to the vehicle-exterior-information detector 141.

In Step S15, the signal processor 213 of the vehicle-exterior-information detector 141 generates three-dimensional detection information including a distance, a speed, and a movement direction (angle) on the basis of the three-dimensional detection result, and outputs the three-dimensional detection information to the object recognition section 214.

In Step S16, the object recognition section 214 performs grouping such that three-dimensional detection results of the same speed, the same distance, and the same movement direction are classified into one group.

In Step S17, the object recognition section 214 generates a three-dimensional box on the basis of a result of the grouping, and outputs the generated three-dimensional box to the three-dimensional-box correction section 215.

In Step S18, the three-dimensional-box correction section 215 performs three-dimensional-box correction processing on the basis of the information regarding a frame that is supplied by the object recognition section 212 and the information regarding a three-dimensional box that is supplied by the object recognition section 214, the frame representing a region of a vehicle in the image. The three-dimensional-box correction section 215 performs correction with respect to a location of the three-dimensional box, and outputs a three-dimensional box obtained by the correction to the surrounding information generator 216.

Figure 12:
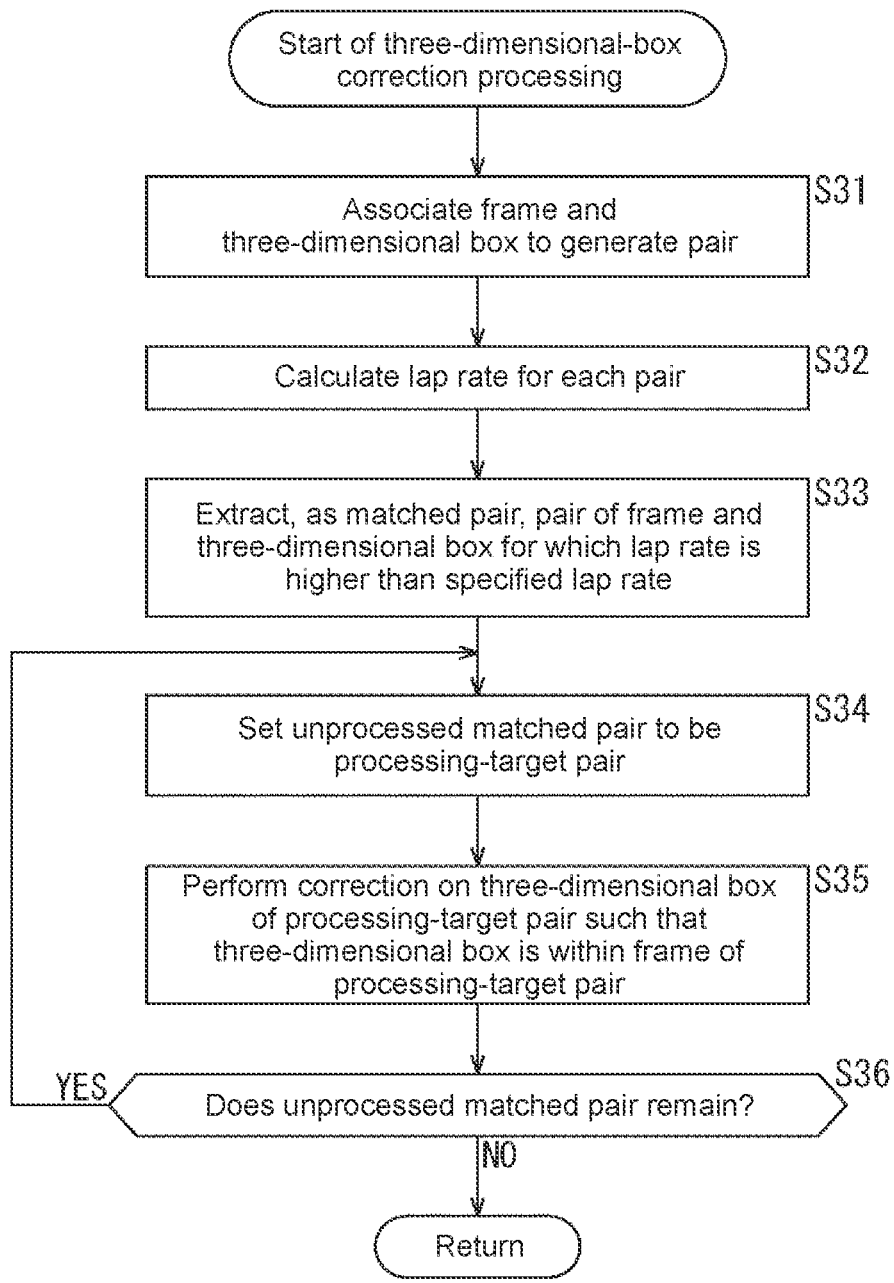
FIG. 12 is a flowchart illustrating a three-dimensional-box correction processing.

Note that the three-dimensional-box correction processing will be described in detail later with reference to a flowchart of FIG. 12.

In Step S19, on the basis of information regarding the three-dimensional box obtained by the correction performed by the three-dimensional-box correction processing with respect to the location, the surrounding information generator 216 generates and outputs the surrounding information described with reference to FIG. 10.

In Step S20, the vehicle-exterior-information detector 141 determines whether an instruction to terminate the surrounding information generating processing has been given. When it has been determined that the instruction to perform the termination has not been given, the process returns to Step S11, and the subsequent processes are repeated.

When it has been determined, in Step S20, that the instruction to perform the termination has been given, the processing is terminated.

According to the series of processes described above, location information regarding a vehicle around an own automobile is obtained as a three-dimensional box, on the basis of an image captured by the camera 201 and a result of detection performed by the millimeter-wave radar 202, and surrounding information is generated on the basis of information regarding the three-dimensional box.

<Three-Dimensional-Box Correction Processing>

Next, the three-dimensional-box correction processing is described with reference to the flowchart of FIG. 12.

In Step S31, the three-dimensional-box correction section 215 generates a pair of information regarding a frame that represents a region of a vehicle in an image, and information regarding a three-dimensional box, the frame and the three-dimensional box being at a corresponding location.

In Step S32, the three-dimensional-box correction section 215 calculates a lap rate for each pair of a frame and a three-dimensional box in a two-dimensional image on the basis of Formula (1) described above.

In Step S33, the three-dimensional-box correction section 215 compares a value of a lap rate for each pair with a specified value, and extracts, as a matched pair, a pair of a frame and a three-dimensional box for which a lap rate exhibits a value larger than the specified value.

In Step S34, the three-dimensional-box correction section 215 sets an unprocessed pair from among the extracted matched pairs to be a processing-target pair.

In Step S35, the three-dimensional-box correction section 215 sets a width of a three-dimensional box of a processing-target pair in the horizontal direction, and a height of the three-dimensional box in the vertical direction, using the method described with reference to FIGS. 7 and 8, and performs correction with respect to the location of the three-dimensional box such that the three-dimensional box is within a frame of the processing-target pair.

In Step S36, the three-dimensional-box correction section 215 determines whether an unprocessed matched pair remains. When it has been determined that an unprocessed matched pair remains, the process returns to Step S34. In other words, the processes of Steps S34 to S36 are repeated until correction is performed on three-dimensional boxes of all of the matched pairs.

Then, correction has been performed on three-dimensional boxes of all of the matched pairs, and when it has been determined, in Step S36, that there is no longer an unprocessed matched pair, the processing is terminated.

In other words, according to the series of processes, a three-dimensional box, from among all of the three-dimensional boxes, for which there is a frame at a location corresponding to the three-dimensional box, and the frame are extracted as a matched pair, the frame representing a region in which there is a vehicle and being obtained on the basis of an image, the paired three-dimensional box and frame being a three-dimensional box and a frame for which a lap rate exhibits a value higher than a specified value. As a result of the series of processes, a three-dimensional box, from among all of the three-dimensional boxes, for which there is not a corresponding frame, is determined to be a ghost and excluded. A three-dimensional box other than the three-dimensional box determined to be a ghost and a corresponding frame are extracted as a matched pair.

Then, using information obtained on the basis of an image, correction is performed with respect to information regarding a width of a three-dimensional box of a matched pair in the horizontal direction and information regarding a height of the three-dimensional box of the matched pair in the vertical direction, and correction is further performed such that the three-dimensional box is within a frame of the matched pair. This results in performing correction with respect to a location of the three-dimensional box.

Accordingly, on the basis of an image, correction is performed with respect to a width of a three-dimensional box in the horizontal direction and a height of the three-dimensional box in the vertical direction, and highly accurate information regarding a distance direction that is obtained by the millimeter-wave radar 202 is left. Further, correction is performed with respect to a location of the three-dimensional box such that the three-dimensional box is within a frame representing a region that is recognized as a vehicle by performing an object recognition using the image. This makes it possible to acquire highly accurate information regarding a three-dimensional box.

This makes it possible to generate surrounding information using a highly accurate three-dimensional box, and thus to control automated driving with a high degree of accuracy.

<Correction Performed According to Installation Locations of Camera and Millimeter-Wave Radar>

It is favorable that both the camera 201 and the millimeter-wave radar 202 be installed to have the same field of view (FOV) from the same location in a vehicle, although their locations may be different.

In this case, there is a need to perform correction according to a difference in installation location.

Figure 13:
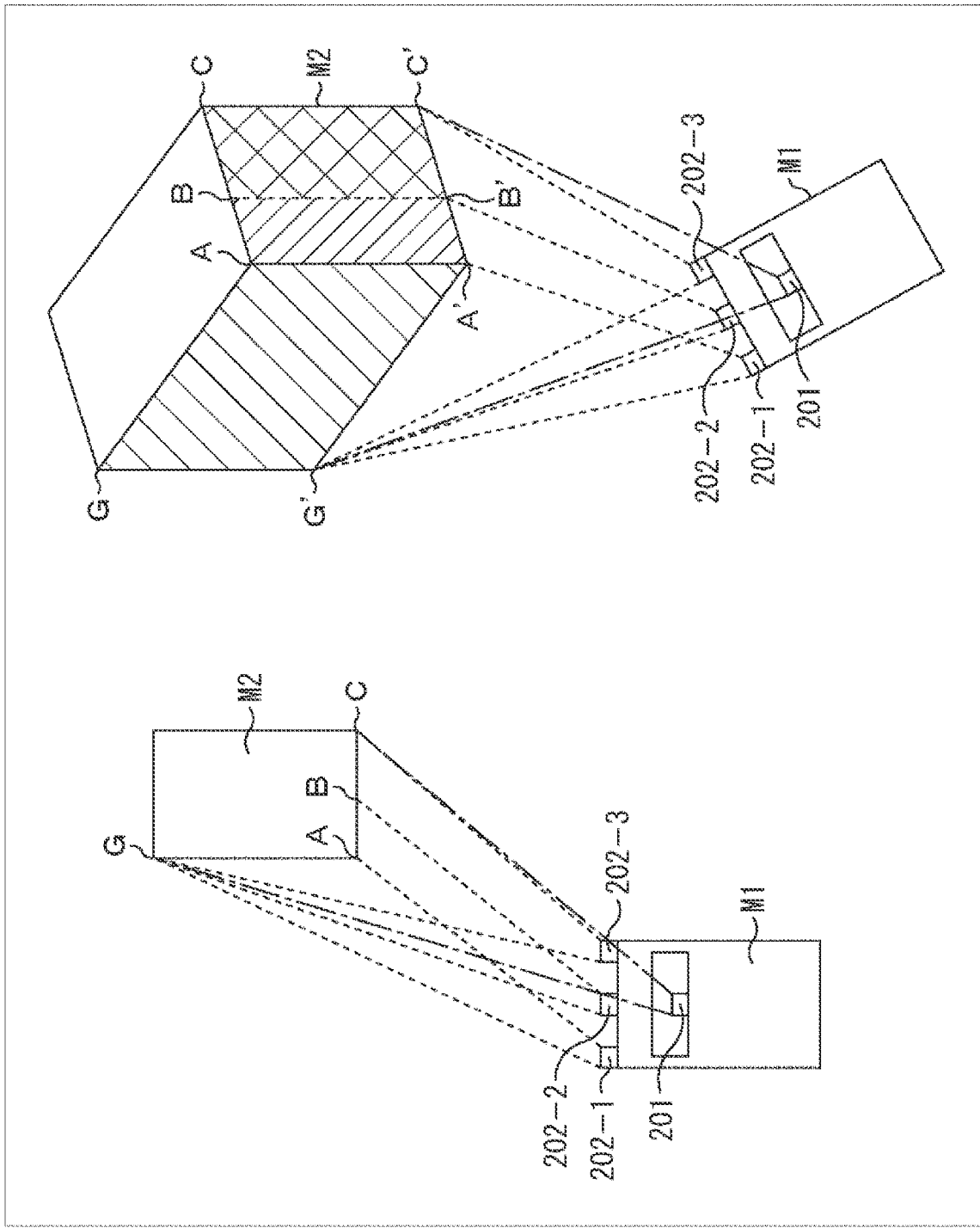
FIG. 13 is a diagram describing correction performed according to an installation location of a millimeter-wave radar.

For example, in the case in which, as illustrated in FIG. 13, the camera 201 is installed in a central upper portion of a windshield of a vehicle M1 that is an own automobile, and the millimeter-wave radar 202 is installed at different locations that are a left front-portion of a vehicle body, a central front-portion of the vehicle body, and a right front-portion of the vehicle body, as indicated using millimeter-wave radars 202-1 to 202-3, a range covered by the millimeter-wave radar 202 differs depending on the installation location when a vehicle M2 ahead of the vehicle M1 on the right is recognized.

Note that, in FIG. 13, the field of view of the camera 201 of the vehicle M1 that is the own automobile is indicated by a dot-dash line, and the fields of view of the millimeter-wave radars 202-1 to 202-3 of the vehicle M1 are each indicated by a dotted line. FIG. 13 illustrates a top view on the left, and a side perspective view of the vehicle M2 on the right. Further, it is assumed that the millimeter-wave radars 202-1 to 202-3 have the same field of view.

It is assumed that, as illustrated in FIG. 13, a range GAC in the top view of FIG. 13 (a range GACC'A'G' in the perspective view) that is the entirety of a left portion and a rear portion of the vehicle M2 is covered by the field of view of the camera 201 indicated by the dot-dash line.

Further, it is assumed that, in this case, the range GAC in the top view of FIG. 13 (the range GACC'A'G' in the perspective view) is covered by the field of view of the millimeter-wave radar 202-3 provided in the right front-portion of the vehicle M1, as in the case of the camera 201.

In such a case, when the millimeter-wave radar 202-3 is displaced to the left in the figure to be installed in the central front-portion of the vehicle M1 as the millimeter-wave radar 202-2, a range in the vehicle M2 that is covered by the field of view of the millimeter-wave radar 202-2 is a range GAB in the top view of FIG. 13 (a range GABB'A'G' in the perspective view) that is narrower than that of the camera 201.

Further, when the millimeter-wave radar 202-2 is further displaced to the left in the figure to be installed in the left front-portion of the vehicle M1 as the millimeter-wave radar 202-1, a range in the vehicle M2 that is covered by the field of view of the millimeter-wave radar 202-1 is a range GA in the top view of FIG. 13 (a range GAA'G' in the perspective view) that is still narrower than that of the millimeter-wave radar 202-2.

As described above, the covered range in the same vehicle M2 differs depending on the installation location of the millimeter-wave radar 202, such as a left front-portion of a vehicle body, a central front-portion of the vehicle body, and a right front-portion of the vehicle body. As described above, a range that can be irradiated with radio waves in the millimeter-wave band, and a range in which the radio waves can be detected as reflected waves differ depending on the installation location of the millimeter-wave radar 202. This results in a change in the location of a detected three-dimensional box corresponding to the vehicle M2.

In other words, a range in the vehicle M2 that is covered by the field of view of the millimeter-wave radar 202-3 is substantially similar to that of the camera 201. Thus, the lap rate for a frame and a three-dimensional box that are respectively obtained from a result of detection performed by the camera 201 and a result of detection performed by the millimeter-wave radar 202-3 is high.

On the other hand, a range in the vehicle M2 that is covered by the field of view of the millimeter-wave radar 202-2 is narrower than that of the camera 201. Thus, the lap rate for a frame and a three-dimensional box that are respectively obtained from a result of detection performed by the camera 201 and a result of detection performed by the millimeter-wave radar 202-2 is lower, compared to the case of the millimeter-wave radar 202-1.

Further, a range in the vehicle M2 that is covered by the field of view of the millimeter-wave radar 202-1 is still narrower than that of the millimeter-wave radar 202-2. Thus, the lap rate for a frame and a three-dimensional box that are respectively obtained from a result of detection performed by the camera 201 and a result of detection performed by the millimeter-wave radar 202-1 is still lower, compared to the case of the millimeter-wave radar 202-2.

Furthermore, a distribution in which peaks of reflected waves are detected differs depending on a change in the field of view of the millimeter-wave radar 202 due to an installation location of the millimeter-wave radar 202, and this results in a generated three-dimensional box being at a location offset from a location in an image captured by the camera 201. Consequently, a three-dimensional box to be properly set may be falsely recognized as a ghost to be removed due to a reduction in lap rate.

For this reason, there is a need to perform correction according to a difference in installation location between the camera 201 and the millimeter-wave radar 202.

When the millimeter-wave radar 202 is installed at a location offset to the left or to the right from an installation location of the camera 201, as illustrated in FIG. 13, a portion of a detection range opposite to the offset direction is out of the field of view of the camera 201. Thus, there is a need to limit the field of view of the camera 201 to a region in which peaks of reflected waves of the millimeter-wave radar 202 are detected.

In other words, when, as illustrated in FIG. 13, the millimeter-wave radar 202 is installed at a location offset to the left from a central location at which the camera 201 of the vehicle M1 is installed, as indicated using the millimeter-wave radar 202-1, a distribution in a right-end portion is missing, the distribution in the right-end portion corresponding to a detection distribution of peaks of reflected waves in a right direction opposite to the offset direction. Thus, a right-side portion of an actual detection distribution of peaks of reflected waves is missing, the distribution representing a region in which the vehicle M2 is actually present.

Therefore, with respect to a three-dimensional box generated ahead on the right, correction is performed such that, from among frames extracted from an image captured by the camera 201, a frame situated in the right-end portion in which peaks of reflected waves are not detected is removed, and correction is performed with respect to the location of the three-dimensional box such that the three-dimensional box coincides a frame remaining as a result of the correction performed with respect to a frame.

In other words, in the case of FIG. 13, the field of view of the camera 201 covers the range GAC indicated by the dot-dash line (the range GACC'A'G' in the perspective view), and the field of view of the millimeter-wave radar 202-1 covers the range GA in the top view of FIG. 13 (the range GAA'G' in the perspective view).

Therefore, when correction is performed on a three-dimensional box obtained on the basis of a result of detection performed by the millimeter-wave radar 202-1, the three-dimensional-box correction section 215 also limits the field of view of the camera 201 to the range GA in the top view of FIG. 13 (the range GAA'G' in the perspective view), and uses a frame obtained from a result of an image recognition performed in a limited range.

In other words, the three-dimensional-box correction section 215 performs correction to limit the field of view of the camera 201 according to a positional relationship between an installation location of the millimeter-wave radar 202, and the camera 201. Such a correction results in suppressing a reduction in lap rate and in preventing a properly set three-dimensional box from being removed with the reduction in lap rate. Accordingly, a matched pair of a three-dimensional box and a frame is properly set.

Consequently, a three-dimensional box is properly set, and this makes it possible to properly perform correction on a three-dimensional box.

4. Application Example

The example in which a pair of a frame and a three-dimensional box for the same vehicle is obtained from among frames obtained from a result of an object recognition performed on the basis of an image captured by the camera 201, and from among three-dimensional boxes obtained from a result of a three-dimensional detection performed by the millimeter-wave radar 202; correction is performed on the three-dimensional box of the pair such that the three-dimensional detection is within the frame of the pair; and then information regarding a proper three-dimensional box to generate surrounding information, has been described above.

In reality, however, there is a possibility that both a frame and a three-dimensional box will not constantly be acquired properly.

Figure 14:
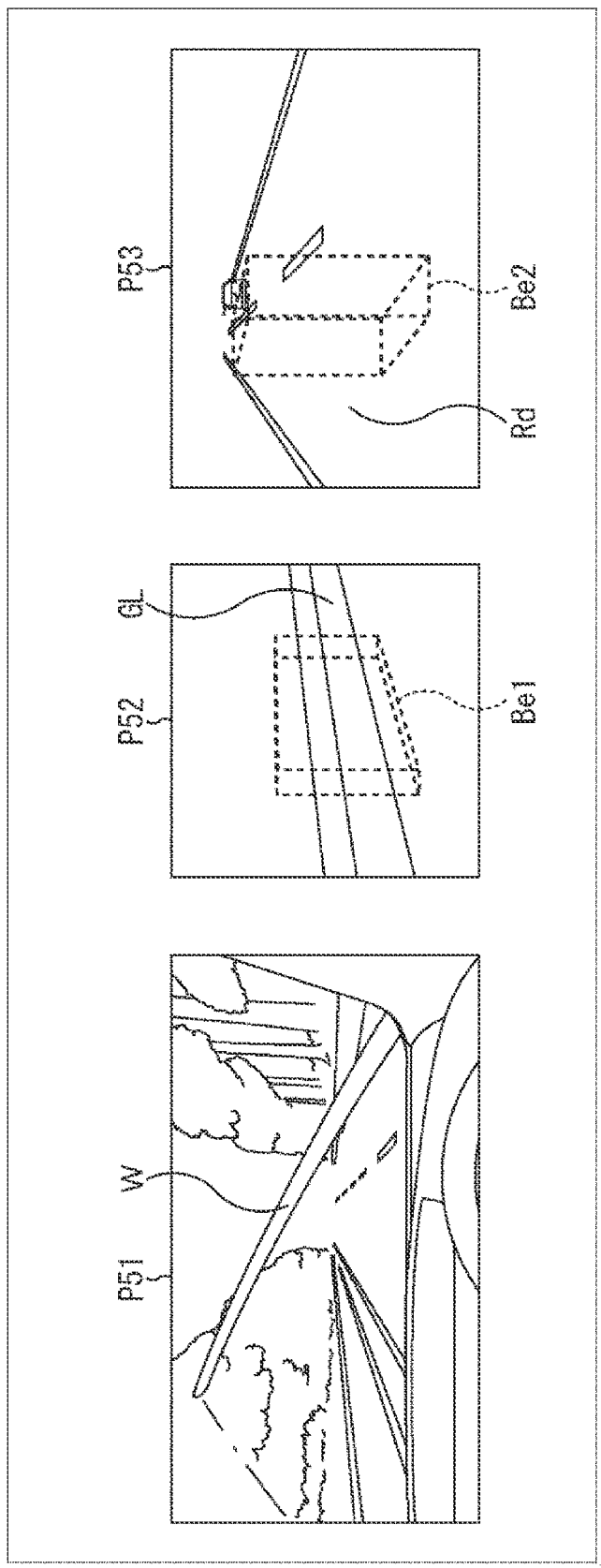
FIG. 14 is a diagram describing an example of causing an error when only a result of detection performed by the millimeter-wave radar is used, or when only a detection result based on an image is used.

There is a possibility that a proper frame will not be obtained when a windshield wiper W or the like that is movable across a windshield may cause a blind in an image captured by the camera 201 provided on an interior surface of the windshield, as shown in, for example, an image P51 of FIG. 14. Further, there is a possibility that it will be difficult to perform an objection recognition using an image captured by the camera 201, for example, at night or during rough weather.

Further, as shown in images P52 and P53 of FIG. 14, a ghost indicated by a three-dimensional box Be1 or Be2 may be detected in a result of detection performed by the millimeter-wave radar 202 in spite of there being no vehicle, due to a distribution of peak intensities of waves reflected off a guard rail GL or a road surface Rd.

Furthermore, radio waves in the millimeter-wave band have the characteristics in that the reflected waves are generated in a direction normal to a surface of an object. Thus, in the case of, for example, a vehicle having a large number of outwardly protrude curves, radio waves are diffused, and this may result in reflected waves with a sufficient intensity not being obtained.

In other words, information regarding a proper three-dimensional box is not obtained only using a frame obtained from an image captured by the camera 201, or only using a three-dimensional box obtained on the basis of a result of detection performed by the millimeter-wave radar 202.

In view of the circumstances described above, the example in which a pair of a frame and a three-dimensional box is set; and correction is performed with respect to a location of the three-dimensional box of the set pair using information regarding the frame of the set pair, has been described above in the present disclosure. However, as described above, there is a possibility that a frame and a three-dimensional box will not constantly be acquired as a pair.

Note that a frame and a three-dimensional box that are registered as a pair may be tracked for a specified period of time to set the three-dimensional box on the basis of only one of the frame and the three-dimensional box.

Figure 15:
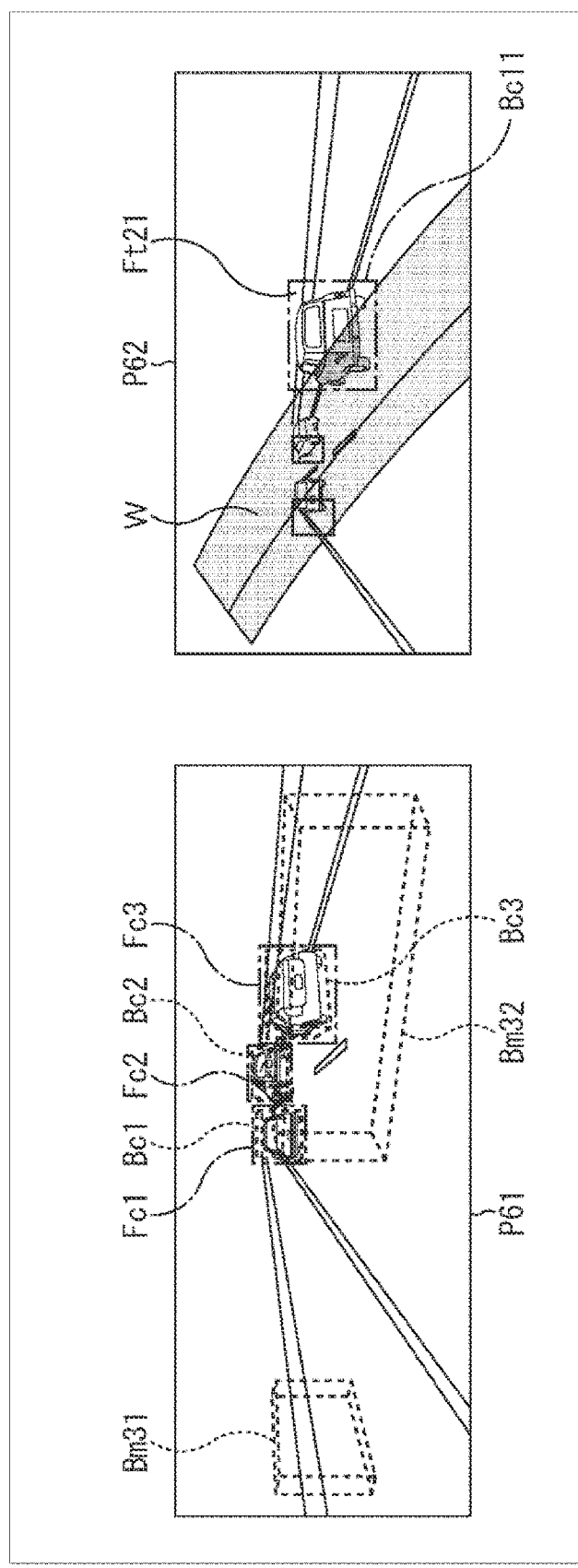
FIG. 15 is a diagram describing an example of properly obtaining a three-dimensional box when only a result of detection performed by the millimeter-wave radar is used, or when only a detection result based on an image is used.

In other words, as shown in, for example, an image P61 of FIG. 15, three-dimensional boxes Bm31 and Bm32 that are obtained using a result of detection performed by the millimeter-wave radar 202 may also each be set in a region in which there is no vehicle.

However, with respect to a frame and a three-dimensional box that are most recently detected as a pair, the frame and the three-dimensional box of the same pair are expected to be detected at a location displaced for a specified period of time from a location of the most recent detection of the pair, the specified period of time being a period of time elapsed since the most recent detection of the pair, the displacement being performed at a speed of and in a direction of the three-dimensional box of the most recently detected pair.

Therefore, when, for example, only the three-dimensional boxes Bm31 and Bm32 that are shown in the image P61 and determined to be ghosts are detected, three-dimensional boxes Bc1 to Bc3 are set that are each obtained by virtually moving a three-dimensional box of a most recently detected pair to a location displaced from a location of a frame of the most recently detected pair, the most recently detected pair being detected a specified period of time before the present point in time, the displacement being performed for the specified period of time on the basis of information regarding a speed and a direction of the three-dimensional box of the most recently detected pair. Then, a three-dimensional box may be generated using each of the virtually set three-dimensional boxes Bc1 to Bc3, and using a corresponding one of frames Fc1 to Fc3 that are obtained from an image.

Further, even in a state in which an image is not properly captured due to the windshield wiper W, as shown in an image P62 of FIG. 15, a frame Ft21 may be virtually set at a location displaced from a location of a frame of a most recently detected pair, the most recently detected pair being detected a specified period of time before the present point in time, the displacement being performed for the specified period of time on the basis of information regarding a speed and a direction of a three-dimensional box of the most recently detected pair. Then, correction may be performed on a three-dimensional box detected by the millimeter-wave radar 202 using the virtually set frame Ft21.

In any case, with respect to a currently missing piece of information regarding one of a frame and a three-dimensional box that are most recently set as a pair, a current location thereof is predicted (tracked) using information regarding a location, a speed, and a direction of the most recently detected three-dimensional box, and the predicted current location is used. This also makes it possible to obtain a three-dimensional box with a relatively high degree of accuracy when one of the pieces of information is missing.

However, there is a reduction in reliability when the tracking continues to be performed in a state in which information regarding one of a frame and a three-dimensional box that are set as a pair remains missing. Thus, the predicted current location is used until a specified period of time has elapsed since the setting of the pair, or for a period of time in which movement is performed by a specified distance, and is not used any longer.

Figure 16:
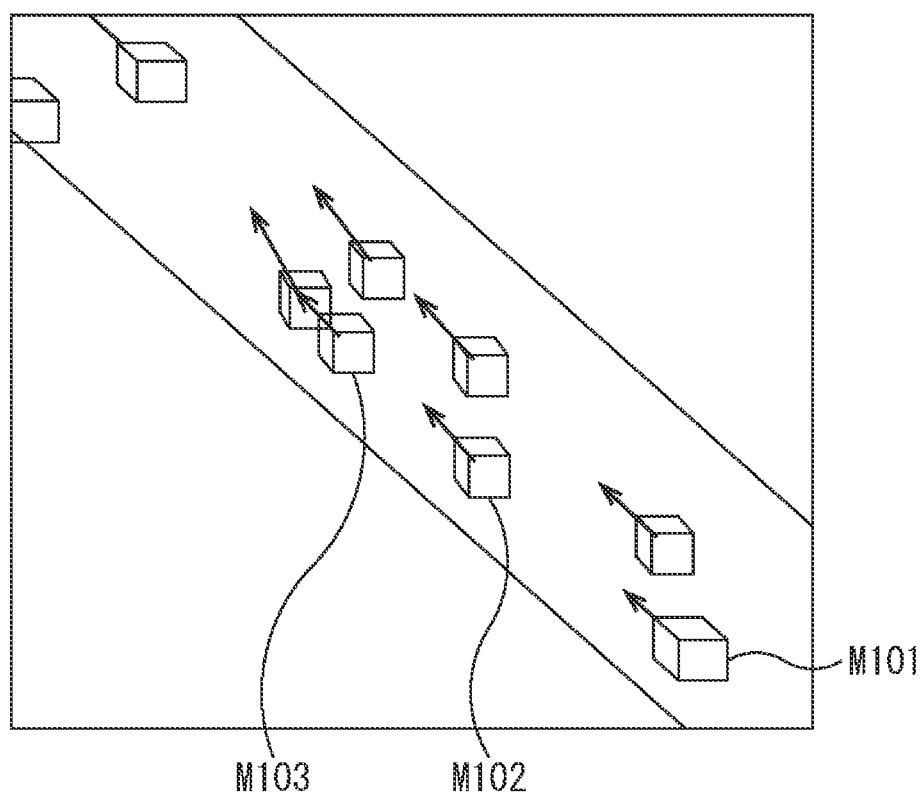
FIG. 16 is a diagram describing an example of properly obtaining a three-dimensional box when a frame is not obtained after the frame and the three-dimensional box are set as a matched pair.

Further, even when a vehicle M103 that corresponds to a frame and a three-dimensional box that have been once set as a pair, has moved to a region ahead of a vehicle M102 that is traveling just ahead of a vehicle M101 that is an own automobile, as illustrated in, for example, FIG. 16, the millimeter-wave radar 202 can detect reflected waves from the vehicle M103 that are reflected off a road surface situated under a vehicle body of the vehicle M102 that is a preceding vehicle.

Thus, in an image captured by the camera 201, a three-dimensional box can be set for a specified period of time once a frame and the three-dimensional box have been set as a pair, even when the vehicle M103 becomes a blind spot due to the vehicle M102 that is a preceding vehicle.

Figure 17:
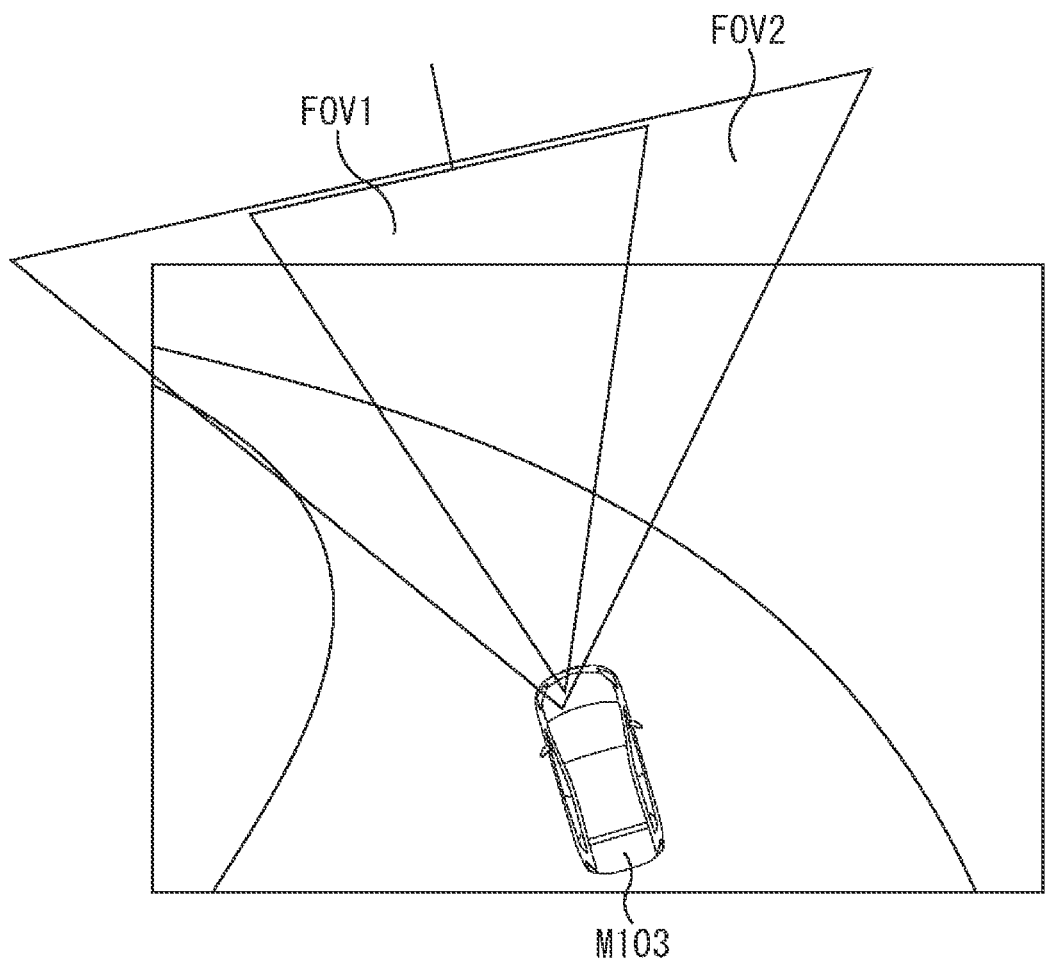
FIG. 17 is a diagram describing an example of properly obtaining a three-dimensional box after a frame and the three-dimensional box are set as a matched pair, in spite of a difference in the field of view between a camera and the millimeter-wave radar.

Further, the present technology is also applicable when a field of view FOV1 of the camera 201 and a field of view FOV2 of the millimeter-wave radar 202 are different from each other, as illustrated in FIG. 17.

The case in which the field of view FOV1 of the camera 201 is smaller than the field of view FOV2 of the millimeter-wave radar 202, as illustrated in, for example, FIG. 17, is discussed.

A three-dimensional box can be generated after a pair of a frame and the three-dimensional box is set in the field of view FOV1, which is a field of view shared by the camera 201 and the millimeter-wave radar 202, even if a preceding vehicle moves to a range in the field of view FOV2 and outside of the field of view FOV1 due to, for example, a curve illustrated in FIG. 17.

In other words, after a pair of a frame and a three-dimensional box is set, a three-dimensional box corresponding to a preceding vehicle can be obtained by performing correction on the basis of current information regarding the three-dimensional box of the pair that is obtained by the millimeter wave radar 202, and on the basis of current information regarding a location of the frame, the location of the frame being predicted on the basis of information regarding a location, a speed, and a direction of the most recently detected three-dimensional box.

Further, it is also possible to obtain a three-dimensional box corresponding to a preceding vehicle in a similar manner when the field of view FOV1 of the camera 201 is larger than the field of view FOV2 of the millimeter-wave radar 202, which is converse to the case illustrated in FIG. 17.

<Three-Dimensional-Box Correction Processing in Application Example>

Figure 18:
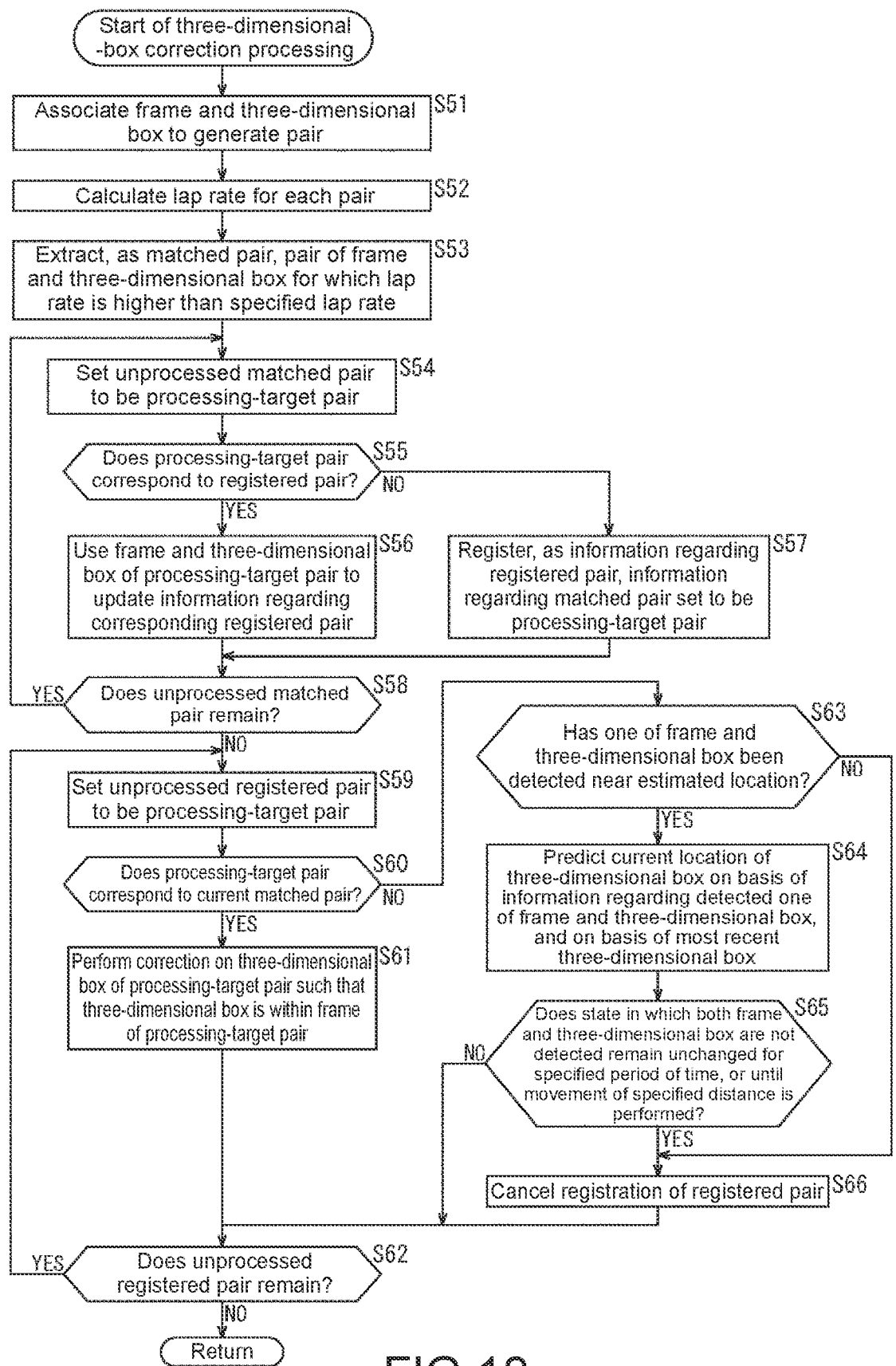
FIG. 18 is a flowchart illustrating another three-dimensional-box correction processing.

Next, a three-dimensional-box correction processing in an application example is described with reference to a flowchart of FIG. 18.

In Step S51, the three-dimensional-box correction section 215 generates a pair of information regarding a frame that represents a region of a vehicle in an image, and information regarding a three-dimensional box, the frame and the three-dimensional box are at a corresponding location.

In Step S52, the three-dimensional-box correction section 215 calculates a lap rate for each pair of a frame and a three-dimensional box in a two-dimensional image on the basis of Formula (1) described above.

In Step S53, the three-dimensional-box correction section 215 compares a value of a lap rate for each pair with a specified value, and extracts, as a matched pair, a pair of a frame and a three-dimensional box for which a lap rate exhibits a value larger than the specified value.

In Step S54, the three-dimensional-box correction section 215 sets an unprocessed pair from among the extracted matched pairs to be a processing-target pair.

In Step S55, the three-dimensional-box correction section 215 determines whether the processing-target pair is a registered pair.

In other words, in registered pairs registered as matched pairs by processes performed up to now, the three-dimensional-box correction section 215 searches for a pair coincident with the processing-target pair, and, on the basis of the presence or absence of such a pair, the three-dimensional-box correction section 215 determines whether the processing-target pair is a registered pair.

More specifically, the three-dimensional-box correction section 215 obtains a pair of a frame and a three-dimensional box as a prediction pair for each registered pair, the pair of the frame and the three-dimensional box being obtained by moving the registered pair for a period of time elapsed since a previous process, the movement being performed on the basis of information regarding a location, a speed, and a direction that is included in information regarding the three-dimensional box.

Then, the three-dimensional-box correction section 215 compares each prediction pair predicted from information regarding a registered pair with a processing-target pair that is current information regarding a frame and a three-dimensional box, and searches for a pair coincident with (close to) the processing-target pair. On the basis of the presence or absence of such a pair, the three-dimensional-box correction section 215 determines whether the processing-target pair is a registered pair.

When it has been determined, in Step S55, that the processing-target pair is a registered pair, the three-dimensional-box correction section 215 performs an update using information regarding a frame and a three-dimensional-box of the processing-target pair as newest information regarding the registered pair.

On the other hand, when it has been determined, in Step S55, that the processing-target pair is not a registered pair, the process moves on to Step S57.

In Step S57, the three-dimensional-box correction section 215 newly registers, as a registered pair, the information regarding the frame and the three-dimensional box of the processing-target pair.

In Step S58, the three-dimensional-box correction section 215 determines whether an unprocessed matched pair remains. When it has been determined that an unprocessed matched pair remains, the process returns to Step S54.

In other words, the processes of Steps S54 to S58 are repeated, and the determination of whether a matched pair is a registered pair is performed with respect to all of the matched pairs. When a matched pair is determined to be registered, information regarding a frame and a three-dimensional box is updated, and when a matched pair is determined to be unregistered, a frame and a three-dimensional box are registered as a new registered pair.

Then, when it has been determined, in Step S58, that there is no longer an unprocessed matched pair, the process moves on to Step S59.

In Step S59, the three-dimensional-box correction section 215 sets an unprocessed registered pair to be a processing-target pair.

In Step S60, the three-dimensional-box correction section 215 determines whether the registered pair set to be a processing-target pair is a matched pair. In other words, it is determined whether both a frame and a three-dimensional box that are registered as the registered pair set to be a processing-target pair are currently detected.

When it has been determined, in Step S60, that the registered pair set to be a processing-target pair is a current matched pair, the process moves on to Step S61.

In Step S61, the three-dimensional-box correction section 215 performs correction on a three-dimensional box of the registered pair set to be a processing-target pair, such that the three-dimensional box is within a frame of the registered pair.

In Step S62, the three-dimensional-box correction section 215 determines whether an unprocessed registered pair remains. When it has been determined that an unprocessed registered pair remains, the process returns to Step S59.

Then, the processes of Steps S59 to S66 are repeated until there is no longer an unprocessed registered pair, and when it has been determined, in Step S62, that there is no longer an unprocessed registered pair, the processing is terminated.

Further, when it has been determined, in Step S60, that the registered pair set to be a processing-target pair is not a current matched pair, that is, when at least one of the frame and the three-dimensional box of the registered pair set to be a processing-target pair has not been detected, the process moves on to Step S63.

In Step S63, the three-dimensional-box correction section 215 determines whether one of a frame and a three-dimensional box that are predicted on the basis of the frame and the three-dimensional box of the registered pair set to be a processing-target pair has been detected.

More specifically, the three-dimensional-box correction section 215 predicts current locations of a frame and a three-dimensional box of a registered pair set to be a processing-target pair, the registered pair being a most recently detected pair detected a specified period of time before the present point in time, the prediction being performed on the basis of information regarding a location, a speed, and a direction of the three-dimensional box of the most recently detected registered pair.

Then, in currently supplied frames and three-dimensional boxes, the three-dimensional-box correction section 215 searches for a frame and a three-dimensional box that are near the predicted frame and three-dimensional box, and, on the basis of the presence or absence of such a frame and such a three-dimensional box, the three-dimensional-box correction section 215 determines whether one of a frame and a three-dimensional box that correspond to the registered pair has been detected.

When it has been determined, in Step S63, that one of the frame and the three-dimensional box that are predicted on the basis of the frame and the three-dimensional box of the registered pair set to be a processing-target pair has been detected, the process moves on to Step S64.

In Step S64, the three-dimensional-box correction section 215 generates a current three-dimensional box on the basis of information regarding detected one of the frame and three-dimensional box corresponding to the frame and the three-dimensional box of the registered pair.

More specifically, when the detected one of the frame and the three-dimensional box of the registered pair is the frame, the three-dimensional-box correction section 215 predicts a current location of the three-dimensional box of the registered pair on the basis of information regarding a location, a speed, and a direction of the three-dimensional box of the registered pair when the registered pair is most recently detected, and performs correction on a three-dimensional box that is a result of the prediction, such that the three-dimensional box is within the currently detected frame to generate a three-dimensional box.

Further, when the detected one of the frame and the three-dimensional box of the registered pair is the three-dimensional box, the three-dimensional-box correction section 215 predicts a current location of the frame of the registered pair on the basis of information regarding a location, a speed, and a direction of the three-dimensional box of the registered pair when the registered pair is most recently detected, and performs correction such that the currently detected three-dimensional box is within a frame that is a result of the prediction.

In Step S65, the three-dimensional-box correction section 215 determines whether a state in which the frame and the three-dimensional box of the registered pair set to be a processing-target pair are not determined to be a matched pair, remains unchanged for a period of time not less than a specified period of time, or for a period of time not less than a period of time for which movement of a specified distance is performed.

In other words, it is determined whether a state in which only one of a frame and a three-dimensional box that correspond to the frame and the three-dimensional box of the registered pair is detected, remains unchanged for a period of time not less than a specified period of time, or until movement of a specified distance is performed.

When it has been determined, in Step S65, that the state in which the frame and the three-dimensional box of the registered pair set to be a processing-target pair are not determined to be a matched pair, remains unchanged for the period of time not less than the specified period of time, or until movement of the specified distance is performed, the process moves on to Step S66.

In Step S66, the three-dimensional-box correction section 215 cancels the registration of the registered pair set to be a processing-target pair.

Further, when it has been determined, in Step S63, that both the frame and the three-dimensional box that are predicted on the basis of the frame and the three-dimensional box of the registered pair set to be a processing-target pair are undetected, the process moves on to Step S66, and the registration of the registered pair set to be a processing-target pair is canceled.

According to the series of processes described above, from among frames each representing a region of a vehicle and each being obtained from a result of an object recognition performed on the basis of an image captured by the camera 201, and from among three-dimensional boxes each being a piece of three-dimensional information in which the vehicle is present and each being obtained on the basis of a result of detection performed by the millimeter-wave radar 202, a frame and a three-dimensional box are determined to be a matched pair when a lap rate for the corresponding frame and three-dimensional box exhibits a value not less than a specified value and when the frame and the three-dimensional box are in a state of being determined to be a pair, and the matched pair is registered as a registered pair.

Further, once a pair of a frame and a three-dimensional box has been registered as a registered pair, information regarding the pair is thereafter updated as long as the pair is detected as a matched pair.

Furthermore, when both a frame and a three-dimensional box that correspond to a pair of a frame and a three-dimensional box that has been registered as a registered pair have been detected, correction is thereafter performed on the detected three-dimensional box on the basis of the detected frame.

Moreover, when only one of a frame and a three-dimensional box that correspond to a pair of a frame and a three-dimensional box that has been registered as a registered pair has been detected, a three-dimensional box is generated on the basis of information regarding the detected one of the frame and the three-dimensional box, and on the basis of information regarding the most recently detected registered frame and three-dimensional box.

Note that, when a state in which only one of a frame and a three-dimensional box is detected remains unchanged for a period of time not less than a specified period of time, or until movement of a specified distance is performed, or when both the frame and the three-dimensional box are undetected, the registration of the frame and the three-dimensional box of the registered pair is canceled.

Accordingly, information regarding a three-dimensional box of a vehicle that is registered as a three-dimensional box of a pair of a frame and a three-dimensional box can be generated for a specified period of time, or for a period of time for which movement of a specified distance is performed, as long as one of the frame and the three-dimensional box is detected.

Consequently, when a pair of a frame and a three-dimensional box is recognized as a matched pair, and registered as a registered pair, a three-dimensional box can be generated even in a state in which a frame is not properly obtained due to a blind being temporarily caused in an image captured by the camera 201, or even in a state in which a three-dimensional box that is a ghost and is a result of detection performed by the millimeter-wave radar 202 is temporarily generated. This makes it possible to continue to generate surrounding information properly, and to properly continue automated driving using the surrounding information.

The example of generating a three-dimensional box using three-dimensional detection information detected by the millimeter-wave radar 202, has been described above. However, the three-dimensional detection information may be detected by another method as long as it is three-dimensional detection information. The three-dimensional detection information used to generate a three-dimensional box may be, for example, three-dimensional group-of-points information detected by, for example, LiDAR or an ultrasonic sonar.

5. Example of Performing Series of Processes Using Software

Note that the series of processes described above can be performed using hardware or software. When the series of processes is performed using software, a program included in the software is installed on a computer from a recording medium. Examples of the computer include a computer incorporated into dedicated hardware, and a computer such as a general-purpose computer that is capable of performing various functions by various programs being installed thereon.

Figure 19:
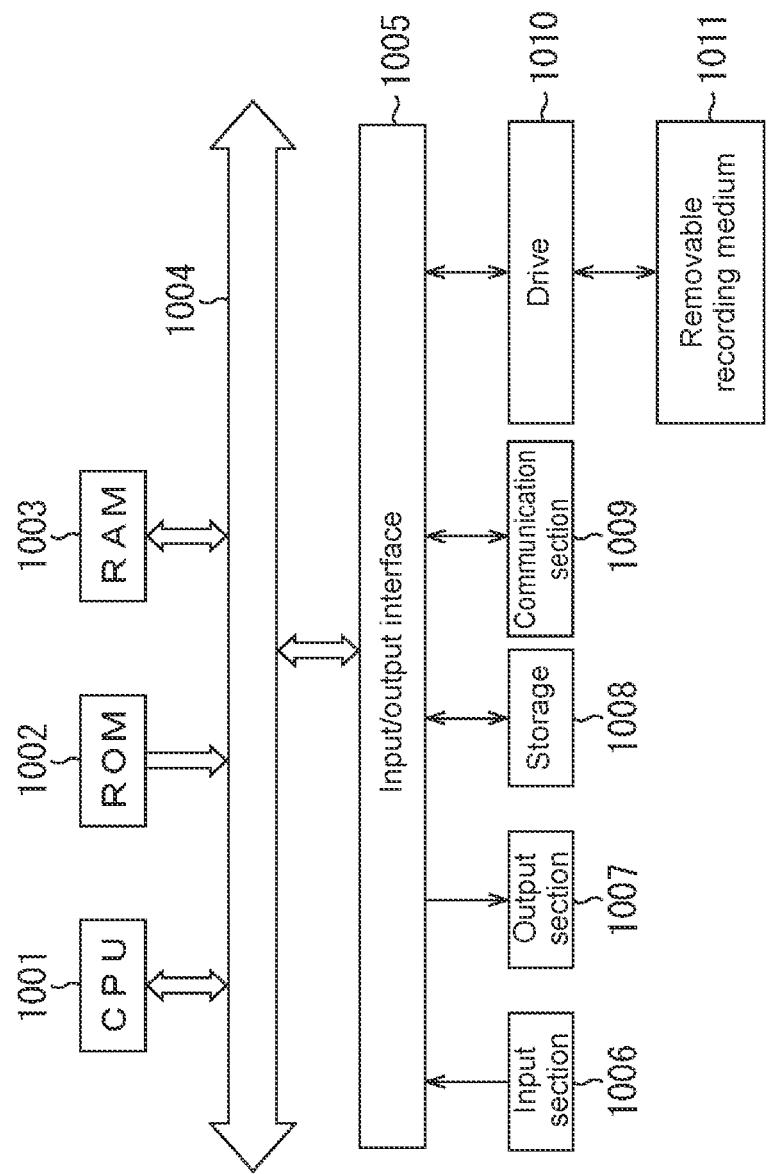
FIG. 19 illustrates an example of a configuration of a general-purpose computer.

FIG. 19 illustrates an example of a configuration of a general-purpose computer. This computer includes a central processing unit (CPU) 1001. An input/output interface 1005 is connected to the CPU 1001 via a bus 1004. A read only memory (ROM) 1002 and a random access memory (RAM) 1003 are connected to the bus 1004.

An input section 1006, an output section 1007, a storage 1008, and a communication section 1009 are connected to the input/output interface 1005. The input section 1006 includes input devices such as a keyboard and a mouse that are used by a user to input an operation command. The output section 1007 outputs a processing operation screen and an image of a processing result to a display device. The storage 1008 includes, for example, a hard disk drive that stores therein a program and various data. The communication section 1009 includes, for example, a local area network (LAN) adapter, and performs communication processing through a network as represented by the Internet. Further, a drive 1010 is connected to the input/output interface 1005. The drive 1010 reads data from and writes data into a removable recording medium 1011 such as a magnetic disk (including a flexible disk), an optical disk (including a compact disc read-only memory (CD-ROM) and a digital versatile disc (DVD)), a magneto-optical disk (including a mini disc (MD)), or a semiconductor memory.

The CPU 1001 performs various processes in accordance with a program stored in a ROM 1002, or in accordance with a program that is read from the removable recording medium 1011 such as a magnetic disk, an optical disk, a magneto-optical disk, or a semiconductor memory to be installed on the storage 1008, and is loaded into a RAM 1003 from the storage 1008. Data necessary for the CPU 1001 to perform various processes is also stored in the RAM 1003 as necessary.

In the computer having the configuration described above, the series of processes described above is performed by the CPU 1001 loading, for example, a program stored in the storage 1008 into the RAM 1003 and executing the program via the input/output interface 1005 and the bus 1004.

For example, the program executed by the computer (the CPU 1001) can be provided by being stored in the removable recording medium 1011 serving as, for example, a package medium. Further, the program can be provided via a wired or wireless transmission medium such as a local area network, the Internet, or digital satellite broadcasting.

In the computer, the program can be installed on the storage 1008 via the input/output interface 1005 by the removable recording medium 1011 being mounted on the drive 1010. Further, the program can be received by the communication section 1009 via the wired or wireless transmission medium to be installed on the storage 1008. Moreover, the program can be installed in advance on the ROM 1002 or the storage 1008.

Note that the program executed by the computer may be a program in which processes are chronologically performed in the order of the description herein, or may be a program in which processes are performed in parallel or a process is performed at a necessary timing such as a timing of calling.

Note that the function of the automated driving controller 112 of FIG. 3 is implemented by the CPU 1001 of FIG. 19. Further, the storage 111 of FIG. 3 is implemented by the storage 1008 of FIG. 19.

Further, the system as used herein refers to a collection of a plurality of components (such as apparatuses and modules (parts)) and it does not matter whether all of the components are in a single housing. Thus, a plurality of apparatuses accommodated in separate housings and connected to one another via a network, and a single apparatus in which a plurality of modules is accommodated in a single housing are both systems.

Note that the embodiment of the present disclosure is not limited to the examples described above, and various modifications may be made thereto without departing from the scope of the present disclosure.

For example, the present disclosure may also have a configuration of cloud computing in which a single function is shared to be cooperatively processed by a plurality of apparatuses via a network.

Further, the respective steps described using the flowcharts described above may be shared to be performed by a plurality of apparatuses, in addition to being performed by a single apparatus.

Moreover, when a single step includes a plurality of processes, the plurality of processes included in the single step may be shared to be performed by a plurality of apparatuses, in addition to being performed by a single apparatus.

Note that the present disclosure may also take the following configurations.

<1> An image processing apparatus, including:
an image-capturing section that captures an image of surroundings of an own automobile;
a frame detector that detects a region of a vehicle in the image as a frame, the vehicle being in the surroundings of the own automobile;
a distance information detector that detects distance information regarding a distance to an object in the surroundings of the own automobile;
a three-dimensional box generator that generates a three-dimensional box on the basis of the distance information detected by the distance information detector, the three-dimensional box indicating a location of the vehicle in the surroundings of the own automobile; and
a three-dimensional-box correction section that performs correction on the three-dimensional box on the basis of the frame.

<2> The image processing apparatus according to <1>, in which
the three-dimensional-box correction section
sets the three-dimensional box and the frame corresponding to the three-dimensional box to be a matched pair, and
extracts the three-dimensional box of the matched pair.

<3> The image processing apparatus according to <2>, in which
the three-dimensional-box correction section
calculates a lap rate for the three-dimensional box and the corresponding frame,
sets, to be the matched pair, the three-dimensional box and the frame for which the lap rate exhibits a value larger than a specified value, and
extracts the three-dimensional box of the matched pair.

<4> The image processing apparatus according to any one of <1> to <3>, in which
the three-dimensional-box correction section performs correction on the three-dimensional box such that the three-dimensional box is within the frame in the image.

<5> The image processing apparatus according to <4>, in which
the three-dimensional-box correction section
corrects for a size of the three-dimensional box in a horizontal direction and in a vertical direction, on the basis of the image in the frame,
performs correction with respect to depth information on the basis of the distance information, and
performs correction on the three-dimensional box such that the three-dimensional box is within the frame in the image.

<6> The image processing apparatus according to <3>, in which
the three-dimensional-box correction section corrects for the lap rate on the basis of a positional relationship in installation location between the image-capturing section and the distance information detector.

<7> The image processing apparatus according to <6>, in which
the three-dimensional-box correction section sets, to be a registered pair, the three-dimensional box and the corresponding frame that have been set to be the matched pair, and
when one of the frame and the three-dimensional box that have been set to be the registered pair is detected after the setting of the registered pair, the three-dimensional-box correction section updates the frame and the three-dimensional box of the registered pair.

<8> The image processing apparatus according to <7>, in which
the three-dimensional-box correction section sets, to be the registered pair, the three-dimensional box and the corresponding frame that have been set to be the matched pair, and when one of the frame and the three-dimensional box, which correspond to the frame and the three-dimensional box that have been set to be the registered pair is undetected for a specified period of time after the setting of the registered pair, the three-dimensional-box correction section estimates the undetected one of the frame and the three-dimensional box on the basis of a speed and a direction of the three-dimensional box registered to be the registered pair, and updates the frame and the three-dimensional box of the registered pair, using a result of the estimation.

<9> The image processing apparatus according to <7>, in which when a state in which one of the frame and the three-dimensional box, which correspond to the frame and the three-dimensional box that have been set to be the registered pair is undetected, remains unchanged for a specified period of time after the setting of the registered pair, or when both the frame and the three-dimensional box that correspond to the registered pair are undetected after the setting of the registered pair, the three-dimensional-box correction section cancels the registration of the frame and the three-dimensional box of the registered pair.

<10> The image processing apparatus according to <9>, in which the specified period of time is a specified period of time elapsed since the registration of the matched pair as the registered pair, or is a period of time for which the own automobile travels a specified distance after the registration of the matched pair as the registered pair.

<11> The image processing apparatus according to <10>, in which when a field of view of the distance information detector is larger than a field of view of the image-capturing section, the state in which one of the corresponding frame and three-dimensional box is undetected after the setting of the registered pair is a state in which the vehicle corresponding to one of the frame and the three-dimensional box that have been set to be the registered pair is traveling in the field of view of the distance information detector and outside of the field of view of the image-capturing section.

<12> The image processing apparatus according to <10>, in which the state in which one of the corresponding frame and three-dimensional box is undetected after the setting of the registered pair is a state in which the vehicle corresponding to one of the frame and the three-dimensional box that have been set to be the registered pair has moved to a region ahead of a preceding vehicle, and is traveling ahead of the preceding vehicle.

<13> The image processing apparatus according to any one of <1> to <12>, in which the frame detector detects the frame including two-dimensional information from the image.

<14> The image processing apparatus according to any one of <1> to <12>, in which the frame detector detects the frame including the distance information from the image.

<15> The image processing apparatus according to any one of <1> to <14>, in which the distance information detector is one of a millimeter-wave radar, LiDAR, and an ultrasonic sonar.

<16> The image processing apparatus according to any one of <1> to <15>, further including a surrounding information generator that arranges the three-dimensional box to generate surrounding information that indicates a location of the vehicle in the surroundings of the own automobile.

<17> The image processing apparatus according to <16>, further including a driving controller that controls driving of the own automobile on the basis of the surrounding information.

<18> An image processing method, including:
capturing an image of surroundings of an own automobile;
detecting a region of a vehicle in the image as a frame, the vehicle being in the surroundings of the own automobile;
detecting distance information regarding a distance to an object in the surroundings of the own automobile;
generating a three-dimensional box on the basis of the distance information detected by the detecting the distance information, the three-dimensional box indicating a location of the vehicle in the surroundings of the own automobile; and
performing correction on the three-dimensional box on the basis of the frame.

<19> A program that causes a computer to operate as an image-capturing section, a frame detector, a distance information detector, a three-dimensional box generator, and a three-dimensional-box correction section, the image-capturing section capturing an image of surroundings of an own automobile;

the frame detector detecting a region of a vehicle in the image as a frame, the vehicle being in the surroundings of the own automobile;

the distance information detector detecting distance information regarding a distance to an object in the surroundings of the own automobile;

the three-dimensional box generator generating a three-dimensional box on the basis of the distance information detected by the distance information detector, the three-dimensional box indicating a location of the vehicle in the surroundings of the own automobile, the three-dimensional-box correction section performing correction on the three-dimensional box on the basis of the frame.

REFERENCE SIGNS LIST 11 vehicle
100 vehicle control system
102 data acquisition section
112 automated driving controller
201 camera
202, 202-1 to 202-3 millimeter-wave radar
211 signal processor
212 object recognition section
213 signal processor
214 object recognition section
215 three-dimensional-box correction section
216 surrounding information generator

The invention claimed is:

1. An image processing apparatus, comprising:
at least one processor configured to:
control an image-capturing section to capture an image of surroundings of an automobile;
detect a region of a vehicle in the image as a frame, wherein the vehicle is in the surroundings of the automobile;
control a distance information detector to detect distance information regarding a distance to an object in the surroundings of the automobile;
generate a three-dimensional box based on the detected distance information, wherein the three-dimensional box indicates a location of the vehicle in the surroundings of the automobile;
calculate a lap rate for the three-dimensional box and a corresponding frame;
correct for the lap rate based on a positional relationship in installation location between the image-capturing section and the distance information detector;
set, to be a matched pair, the three-dimensional box and the frame for which the lap rate exhibits a value larger than a specified value;
extract the three-dimensional box of the matched pair;
set, to be a registered pair, the three-dimensional box and the corresponding frame that have been set to be the matched pair;
in case where one of the frame or the three-dimensional box that have been set to be the registered pair is detected after the setting of the registered pair, update the frame and the three-dimensional box of the registered pair; and
perform correction on the three-dimensional box of the registered pair based on the frame.

2. The image processing apparatus according to claim 1, wherein the at least one processor is further configured to perform the correction on the three-dimensional box such that the three-dimensional box is within the frame in the image.

3. The image processing apparatus according to claim 2, wherein the at least one processor is further configured to:
correct for a size of the three-dimensional box in a horizontal direction and in a vertical direction, based on the image in the frame;
perform the correction with respect to depth information based on the distance information; and
perform the correction on the three-dimensional box such that the three-dimensional box is within the frame in the image.

4. The image processing apparatus according to claim 1, wherein the at least one processor is further configured to:
set, to be the registered pair, the three-dimensional box and the corresponding frame that have been set to be the matched pair;
in a case where one of the frame or the three-dimensional box, which correspond to the frame and the three-dimensional box that have been set to be the registered pair, is undetected for a specified period of time after the setting of the registered pair, estimate the undetected one of the frame or the three-dimensional box based on a speed and a direction of the three-dimensional box registered to be the registered pair; and
update the frame and the three-dimensional box of the registered pair, based on a result of the estimation.

5. The image processing apparatus according to claim 1, wherein in a case where a state in which one of the frame or the three-dimensional box, which correspond to the frame and the three-dimensional box that have been set to be the registered pair is undetected, remains unchanged for a specified period of time after the setting of the registered pair, or in a case where both the frame and the three-dimensional box that correspond to the registered pair are undetected after the setting of the registered pair, the at least one processor is further configured to cancel a registration of the frame and the three-dimensional box of the registered pair.

6. The image processing apparatus according to claim 5, wherein the specified period of time is one of a time elapsed since the registration of the matched pair as the registered pair or a time for which the automobile travels a specified distance after the registration of the matched pair as the registered pair.

7. The image processing apparatus according to claim 6, wherein in a case where a field of view of the distance information detector is larger than a field of view of the image-capturing section, the state in which one of the corresponding frame or the three-dimensional box is undetected after the setting of the registered pair is a state in which the vehicle corresponding to one of the frame or the three-dimensional box that have been set to be the registered pair is traveling in the field of view of the distance information detector and outside of the field of view of the image-capturing section.

8. The image processing apparatus according to claim 6, wherein the state in which one of the corresponding frame or the three-dimensional box is undetected after the setting of the registered pair is a state in which the vehicle corresponding to one of the frame or the three-dimensional box that have been set to be the registered pair has moved to a region ahead of a preceding vehicle, and is traveling ahead of the preceding vehicle.

9. The image processing apparatus according to claim 1, wherein the at least one processor is further configured to detect the frame including two-dimensional information from the image.

10. The image processing apparatus according to claim 1, wherein the at least one processor is further configured to detect the frame including the distance information from the image.

11. The image processing apparatus according to claim 1, wherein the distance information detector includes one of a millimeter-wave radar, LiDAR, or an ultrasonic sonar.

12. The image processing apparatus according to claim 1, wherein the at least one processor is further configured to arrange the three-dimensional box to generate surrounding information that indicates the location of the vehicle in the surroundings of the automobile.

13. The image processing apparatus according to claim 12, further comprising a driving controller configured to control driving of the automobile based on the surrounding information.

14. An image processing method, comprising:
controlling an image-capturing section to capture an image of surroundings of an automobile;
detecting a region of a vehicle in the image as a frame, wherein the vehicle is in the surroundings of the automobile;
controlling a distance information detector to detect distance information regarding a distance to an object in the surroundings of the automobile;
generating a three-dimensional box based on the distance information, wherein the three-dimensional box indicates a location of the vehicle in the surroundings of the automobile;
calculating a lap rate for the three-dimensional box and a corresponding frame;
correcting for the lap rate based on a positional relationship in installation location between the image-capturing section and the distance information detector;
setting, to be a matched pair, the three-dimensional box and the frame for which the lap rate exhibits a value larger than a specified value;
extracting the three-dimensional box of the matched pair;
setting, to be a registered pair, the three-dimensional box and the corresponding frame that have been set to be the matched pair;

in case where one of the frame or the three-dimensional box that have been set to be the registered pair is detected after the setting of the registered pair, updating the frame and the three-dimensional box of the registered pair; and performing correction on the three-dimensional box of the registered pair based on the frame.

15. A non-transitory computer-readable medium having stored thereon computer-executable instructions, that when executed by a processor, cause the processor to execute operations, the operations comprising:

controlling an image-capturing section to capture an image of surroundings of an automobile;

detecting a region of a vehicle in the image as a frame, wherein the vehicle is in the surroundings of the automobile;

controlling a distance information detector to detect distance information regarding a distance to an object in the surroundings of the automobile;

generating a three-dimensional box based on the detected distance information, wherein the three-dimensional box indicates a location of the vehicle in the surroundings of the automobile;

calculating a lap rate for the three-dimensional box and a corresponding frame;

correcting for the lap rate based on a positional relationship in installation location between the image-capturing section and the distance information detector;

setting, to be a matched pair, the three-dimensional box and the frame for which the lap rate exhibits a value larger than a specified value;

extracting the three-dimensional box of the matched pair;

setting, to be a registered pair, the three-dimensional box and the corresponding frame that have been set to be the matched pair;

in case where one of the frame or the three-dimensional box that have been set to be the registered pair is detected after the setting of the registered pair, updating the frame and the three-dimensional box of the registered pair; and performing correction on the three-dimensional box of the registered pair based on the frame.

\* \* \* \* \*